US006217832B1

(12) United States Patent
Betta et al.

(10) Patent No.: US 6,217,832 B1
(45) Date of Patent: Apr. 17, 2001

(54) SUPPORT STRUCTURES FOR A CATALYST

(75) Inventors: Ralph Dalla Betta, Mountain View; James Cameron Schlatter, Palo Alto; Sarento George Nickolas, San Jose, all of CA (US); Walter Wiley, Palm Beach Gardens, FL (US)

(73) Assignee: Catalytica, Inc., Mountain View, CA (US)

( * ) Notice: Subject to any disclaimer, the term of this patent is extended or adjusted under 35 U.S.C. 154(b) by 0 days.

(21) Appl. No.: 09/070,443

(22) Filed: Apr. 30, 1998

(51) Int. Cl.$^{7}$ .............................. B01D 53/34; B01J 8/04; B01J 35/04

(52) U.S. Cl. .......................... 422/179; 422/177; 422/190; 422/221

(58) Field of Search .................................... 422/179, 177, 422/171, 190, 211, 221, 222, 239, 311

(56) References Cited

U.S. PATENT DOCUMENTS 4,448,754 * 5/1984 Isogai et al. ......................... 422/179
5,140,813 * 8/1992 Whittenberger ....................... 60/300
6,017,498 * 1/2000 Harding .............................. 422/179

FOREIGN PATENT DOCUMENTS

97/47926 * 12/1997 (WO) .

* cited by examiner

*Primary Examiner*—Shrive Beck
*Assistant Examiner*—Alexa A. Doroshenk
(74) *Attorney, Agent, or Firm*—Townsend and Townsend and Crew LLP

(57) ABSTRACT

An improved catalytic reactor for high temperature reactions having a reaction chamber and a monolithic catalyst structure disposed in the reaction chamber is disclosed wherein the catalyst structure has a multiplicity of longitudinally disposed channels formed by thin metal substrate walls which expand on exposure to the heat generated in high temperature reactions and reactor also includes a monolithic open cellular support structure disposed in the reaction chamber having a multiplicity of longitudinally disposed passageways formed by strips of high temperature resistant metal or ceramic material with the support structure being secured on its outer periphery to the wall of the reaction chamber to limit movement along the longitudinal axis, and being positioned at and abutting against the outlet end of the catalyst structure. The improved structure also includes: (a) an annular space between the outer periphery of the catalyst structure and the wall of the reaction chamber which is sized to accommodate the thermal expansion of the catalyst structure which occurs during the high temperature reaction without allowing the catalyst structure to be deformed by pressing against the reaction chamber wall; (b) a plurality of flexible flanges which extend from the outer peripheral surface of the catalyst structure to the inner surface of the reaction chamber tubular wall to substantially block the flow of reaction gas mixture through the annular space; (c) a radial centering assembly which includes cooperating struts and splines mounted on the chamber wall and the support structure to permit thermal expansion of the support structure; (d) an optional centering support structure for transferring a portion of the force from the flow of gases onto a second support structure positioned on the inlet side of the catalyst structure; and (e) an outer metal band for the support structure having slots formed therein to provide sufficient flexibility for thermal expansion of the support structure while providing additional support therefor.

5 Claims, 18 Drawing Sheets

SUPPORT STRUCTURES FOR A CATALYST

FIELD OF THE INVENTION

This invention relates to improved catalyst structures and support structures for securing and radially centering monolithic catalyst structures used in high temperatures reactions, such as catalytic combustion, within a reaction chamber or reactor. In addition, the present invention is directed to a method for using the improved catalyst and support structures in high temperature catalytic processes, like catalytic combustion for gas turbine power plants.

BACKGROUND OF THE INVENTION

A variety of high temperature processes are known which employ monolithic catalyst structures to promote the desired reactions, for example, partial oxidation of hydrocarbons, complete oxidation of hydrocarbons for emissions control, catalytic mufflers in automotive emissions control and catalytic combustion of fuels for further use in gas turbines, furnaces and the like. Typical of such catalytic systems are the catalysts used in thermal combustion units for gas turbines to provide low emissions and high combustion efficiency. To achieve high turbine efficiency, a high gas temperature is typically required. This, of course, places a high thermal stress on the catalyst monolith employed. An example of a monolithic catalyst structure is a unitary or bonded metallic or ceramic structure made up of a multitude of longitudinally disposed channels for passage of the combustion gas mixture. At least a portion of the channels are coated on their internal surfaces with a combustion catalyst.

In addition to high thermal stress, the high gas flow rates characteristic of combustion units in gas turbines place a significant axial load or force on the catalyst structure pushing in the direction of the gas flow due to the resistance to gas flow, i.e., friction, in the longitudinally disposed channels of the catalyst structure. For example, if a multi-stage monolithic catalyst structure such as that described in U.S. Pat. No. 5,183,401 to Dalla Betta et al. is employed as a 20 inch diameter catalyst in a catalytic combustion reactor where the air/fuel mixture flow rate is about 50 lbs/second at a pressure drop through the catalyst of 4 psi, the total axial load on the catalyst would be about 1,260 lbs.

The combination of exposure to both high temperatures, e.g., temperatures approaching and even exceeding 1,000° C., where metallic monoliths begin to lose strength, and the aforesaid large axial loads (from high gas flow rates) can cause significant movement or deformation of the catalyst support in the direction of the gas flow. In fact, in cases where a corrugated metal foil catalyst monolith is used in which the corrugated foil is rolled together in a non-nesting fashion to form a cylindrical, spiral structure in which the foil layers are not bonded together, the combined high temperature and large axial load from high gas flow can cause the whole structure to telescope in the direction of gas flow, particularly when the axial force exceeds the foil-to-foil sliding resistance in the wound structure. Thus, there is a need to provide a support for the catalyst structure to secure it from movement and/or deformation along its axis in the direction of gas flow by means of a support structure which will provide the necessary support at high temperatures preferably without interfering with the efficiency and effectiveness of catalytic combustion as a source of motive force for a gas turbine.

Monolithic catalyst structures can be supported by positioning struts or bars adjacent the outlet end of the catalyst structure. In U.S. Pat. No. 5,461,864 to Dalla Betta et al., the use of internally cooled support struts or bars at the outlet of the catalyst structure is described as a means to support the catalyst. This approach, however, has the disadvantage that the support struts require a source of cooling air and this results in a more complicated combustion system design or requires the use of high pressure air that may not be available in the gas turbine machine. Also, since the air cooled struts are rather widely spaced over the face of the catalyst, high local contact forces or stresses can result. In certain portions of the catalyst design, these contact forces can exceed the yield strength of the relatively thin foil of the catalyst structure resulting in deformation of the foil. This would clearly not be a desirable result and would detract from usage of the air-cooled support struts in high axial load applications.

To overcome the disadvantage of the internally cooled support struts or bars, a monolithic honeycomb or monolithic open cellular support structure can be used to support the monolithic catalyst structure. Copending U.S. patent application Ser. No. 08/462,639 to Dalla Betta et al. Filed on Jun. 5, 1995 describes such a monolithic open support structure. The support structure includes a multiplicity of longitudinally disposed parallel channels positioned adjacent one another, similar to a honeycomb structure. The support structure is formed by relatively thin strips or ribs of high temperature resistant metal or ceramic material which are bonded together to form a unitary structure. The support structure abuts against and extends over the entire outlet face of the catalyst structure. The channels provide for passage of the flowing gas mixture through the support structure. The peripheral edge of the support structure is secured to the reaction chamber wall so that the axial load acting on the support structure is transferred to the reaction chamber wall, for example, such as by a radially inwardly extending ridge formed on the reaction chamber wall.

It has been discovered that during operation of the gas turbine reactor, the high temperatures generated therein cause the relatively thin walled monolithic open cellular support structure and catalyst structure to thermally expand by a significantly greater magnitude than the relatively thick walled reaction chamber wall. To overcome this problem and avoid crushing or deformation of the catalyst and support structures, the support structure and the catalyst structure should be sized so that their outside diameters are smaller than the inside diameter of the reaction chamber wall to allow thermal expansion of the support structure during such high temperature operation. If the outside diameter of the support structure is too large, the support structure may deform or bulge outwardly against the catalyst structure resulting in significant damage to the foils of the catalyst structure.

During operation of the reactor, the temperatures of the gas mixture, the catalyst structure, the support structure, and the reaction chamber wall can vary, resulting in different rates of thermal expansion for the catalyst structure, the support structure, and the reaction chamber wall. For example, the reactor can have a preburner located upstream of the catalyst. The preburner is used to start the reactor and provide a required catalyst inlet temperature. Initially, fuel is added to the preburner to give a high temperature gas which flows through the catalyst and to the turbine to start the engine. Since the preburner can respond relatively quickly, the temperature of the gas exiting the preburner and flowing into the catalyst structure rises relatively rapidly. The catalyst substrate has a relatively low heat capacity and also increases in temperature quickly. Similarly, the support structure increases in temperature relatively quickly due to the relatively thin metal monolithic structure. The rapid rise in temperature of the catalyst structure and the support structure causes rapid thermal expansion therein. However, due to the thickness of the reaction chamber wall and exposure to cooler air on the outside thereof, the reaction chamber wall heats up at a lower rate, and thermally expands at a slower rate than the catalyst structure and the support structure.

To avoid the deformation and crushing of the catalyst structure and the support structure, the dimensions of the outside diameter of the catalyst and support structure and the catalyst structure, and the inner diameter of the reaction chamber wall can be sized so that there would be substantially no gap therebetween during the initial heating of the reactor. However, once the reactor reaches an idle condition and the reaction chamber wall rises in temperature, a gap would exist between the reaction chamber wall and the catalyst and support structures. After idle condition, the preburner is turned down and the catalyst structure and the support structure would cool and thermally contract away from the reaction chamber wall, thereby increasing the space therebetween.

Although the outside diameter of the catalyst and support structure and the catalyst structure can be reduced to compensate for the thermal expansion, this results in a relatively large annular gap or space between the inside diameter of the reaction chamber wall and with the outside diameters of the catalyst and support structures during various cycles of the gas turbine. Due to the relatively large annular space, a significant amount of gas mixture can bypass the catalyst structure resulting in non-uniform temperatures and gas compositions at the outlet of the catalyst structures. This, in turn, can produce significantly high undesirable emissions, such as Carbon Monoxide (CO) and Unburned Hydrocarbons (UHC) and/or result in higher combustion temperatures in the homogeneous combustion zone downstream of the catalyst, thus producing higher nitrogen oxide ($NO_x$) emissions. It has been discovered that the positioning of the support structure against the radially inwardly extending ridge formed on the reaction chamber may not provide an adequate seal therebetween and can allow an unacceptable amount of gas flow through the annular space.

It has also been found that the catalyst structure and the support structure can thermally expand in a lateral direction in a non-uniform manner, especially if the support structure possesses a different coefficient of thermal expansion than the catalyst structure. The lateral movement can cause the outlet face of the catalyst structure to scrape against the inlet face of the support structure resulting in damage to the catalyst foils.

BRIEF SUMMARY OF THE INVENTION

This invention relates in general to gas turbine catalytic combustors and in particular to improved catalyst structures and support structures for supporting a catalyst structure placed within a reaction chamber of the combustor.

The catalytic reactor of the present invention has a reaction chamber defined by a tubular wall defining a longitudinal axis. The reactor further includes a monolithic catalyst structure disposed within the reaction chamber. The catalyst structure has an outer peripheral surface and a multiplicity of longitudinally disposed channels. The channels are formed by thin metal substrate walls which expand on exposure to the heat generated in the high temperature reactions which occur within the reactor. The channels have inlet and outlet ends for passage of a flowing reaction gas mixture. The reactor also includes a monolithic open cellular support structure disposed in the reaction chamber having an outer periphery and a multiplicity of longitudinally disposed passageways, wherein the passageways are formed by strips of high temperature resistant metal or ceramic material. The cells have openings which are in fluid communication with the outlet end of the channels of the catalyst structure. The support structure is secured on its outer periphery to the wall of the reaction chamber to limit movement along the longitudinal axis, and is positioned at and abutting against at least the outlet end of the catalyst structure. For example, the support structure can be secured by a shelf extending from the inner surface of chamber wall. The catalyst structure of the invention is sized such that it has a smaller cross-sectional area, taken in a direction perpendicular to its longitudinal axis, than the cross-sectional area of the reaction chamber such that a preselected annular space is formed between the outer periphery of the catalyst structure and the wall of the reaction chamber, the annular space being sized to allow for thermal expansion of the catalyst structure which occurs during the high temperature combustion reaction without causing the catalyst structure to be compressed and deformed by pressing against the reaction chamber wall.

The reactor further includes a plurality of flexible flanges, in accordance with the present invention which extend from the outer peripheral surface of the catalyst structure to the inner surface of the reaction chamber tubular wall. The flanges substantially block the flow of reaction gas mixture through the annular space which would otherwise escape. The flanges are sufficiently flexible to allow bending as the catalyst structure undergoes thermal expansion, and to prevent localized deformation of the catalyst structure where the flanges contact the catalyst structure.

In another embodiment of the support structure in accordance with the present invention, a radial centering assembly is disclosed which secures the support structure to the chamber wall by means of a plurality of cooperating struts and splines. One of the plurality of struts or splines is mounted on the inner surface of the chamber wall and the other or its mating member is mounted on the outer periphery of the support structure. The depth of the groove in the spline mating with its corresponding strut is sufficient to permit thermal expansion of the support structure while radially centering the support structure with respect to the longitudinal axis of the reaction chamber. Therefore, the support structure is free to thermally expand radially outwardly while being prevented from rotating in a circumferential direction.

In another embodiment of the support structure in accordance with the present invention, a center support member is used in cooperation with an inlet and outlet support structure positioned on either side of the catalyst structure. The center support member extends from, the middle of the outlet support structure through the center of the catalyst structure in a longitudinal direction to the middle of the inlet support structure, where the center support member is also secured. A portion of the force exerted on the outlet end of said support structure by the flowing reaction gas mixture is thereby transferred via the center support member to the inlet support structure.

In yet another embodiment of the support structure in accordance with the present invention, the support structure includes an outer band bonded to the periphery of the support structure. The outer band has a thickness which is greater than the thickness of the walls of the cells. The outer band has slots formed therein to provide sufficient flexibility in the outer band to absorb the thermal expansion of the walls of the support structure cells which occurs during the high temperature reaction within the reactor. The outer band expands without causing the open cellular support structure to deform due to the difference in thermal expansion between the open cellular structure and the band bonded thereto.

Other aspects of the invention include a method for securing the monolithic catalyst structure in a reaction chamber of a reactor using the monolithic open cellular support structure and supporting structures of the present invention.

Various objects and advantages of this invention will become apparent to those skilled in the art from the following detailed description of the preferred embodiment, when read in light of the accompanying drawings.

DETAILED DESCRIPTION OF THE INVENTION

Figure 1:
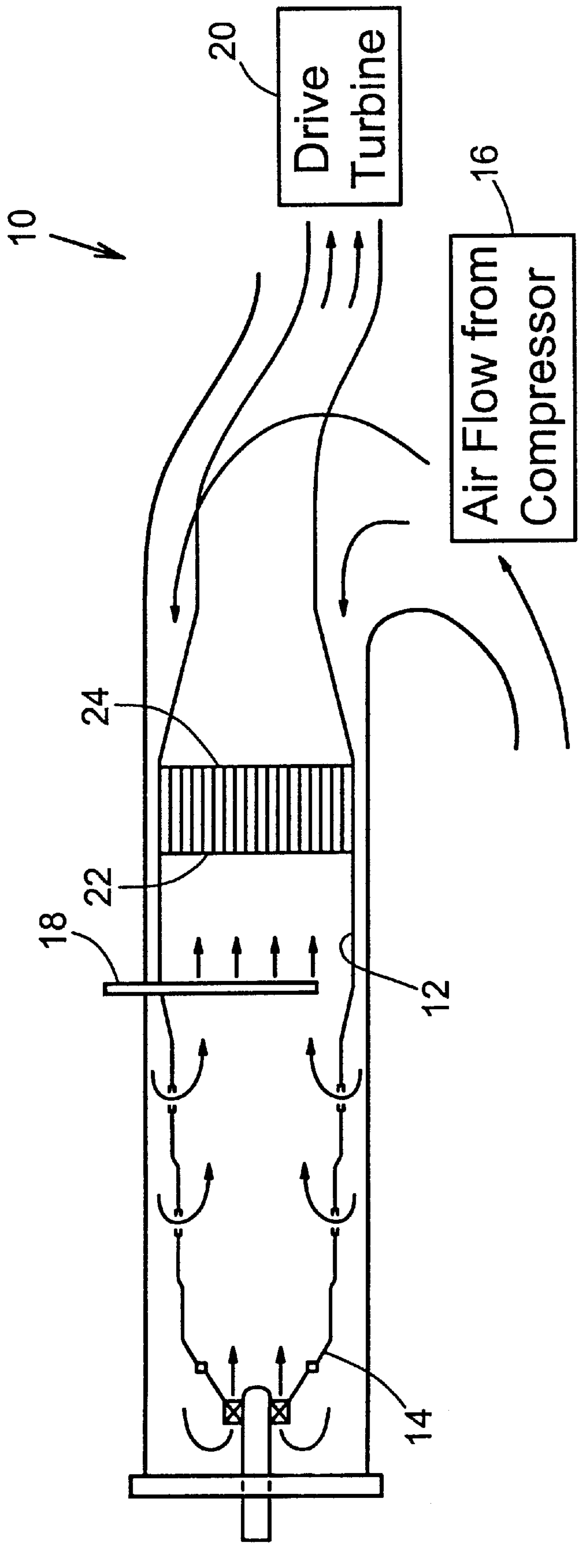
FIG. 1 is a schematic cross-section representation of a catalytic combustion reactor for use in a gas turbine combustor.

Referring now to the drawings, there is schematically illustrated in FIG. 1, a typical catalytic combustion reactor, indicated generally at (10). The reactor includes a reaction chamber (12) which is downstream of a preburner (14). The reactor further includes a compressor (16) which draws in air, pressurizes the air, and then delivers the pressurized air into the reaction chamber. The fuel, which is introduced to the reaction chamber (12) via a fuel injector (18), and air are mixed and ignited, causing expansion thereof such that the hot gases leave the reaction chamber (12) and pass into to a drive turbine (20).

A catalyst structure (22) is disposed within the reaction chamber (12). The catalyst structure (22) is positioned with its longitudinal passageways parallel to the flow of an oxygen-containing gas, such as air, and fuel mixture. The catalyst structure is positioned in this manner to obtain a uniform flow of air/fuel mixture through the catalyst structure. The mixture passes through longitudinal passageways or channels formed in the catalyst structure. If desired, multiple catalyst structures can be placed in series within the reaction chamber. In order to maintain the catalyst structure in a stable position in the reactor, it is necessary to employ some type of support means or structure to secure the catalyst structure to the reactor, including, as one possibility, a support structure which abuts an outlet end (24) of the catalyst structure (22).

As used herein, the term "outlet end" refers to the downstream end of the component described where the partially or completely combusted air/fuel mixture exits the component. The term "inlet end" refers to the upstream end of the component described where the uncombusted air/fuel mixture is initially introduced to the component.

Figure 2A:
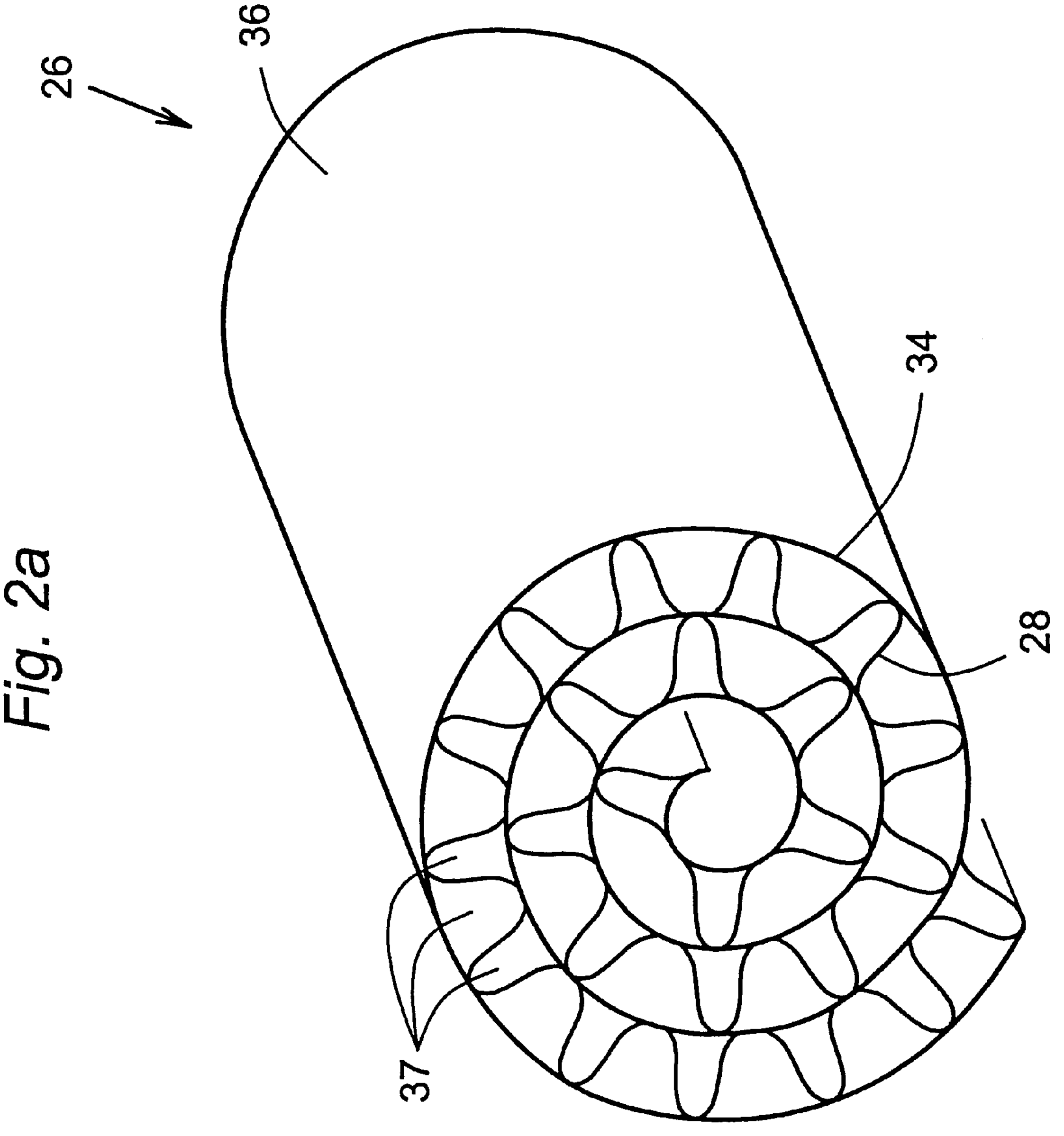
FIGS. 2A and 2B depict the fabrication of a monolithic catalyst structure which may be usefully secured within a reactor using the support structure elements of the present invention.
Figure 2B:
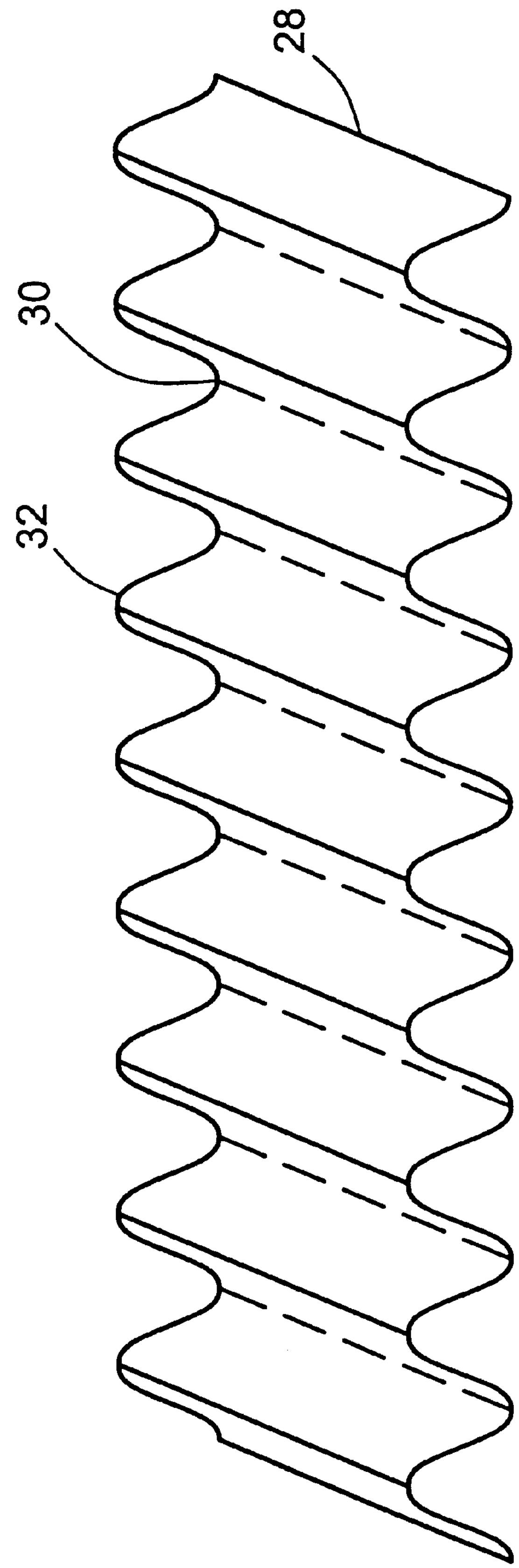

The catalyst structure can be made according to any of the well-known designs, such as a monolithic catalyst structure comprising a multiplicity of parallel longitudinal channels or passageways at least partially coated with catalyst. Typical catalyst structures are disclosed in a variety of published references including U.S. Pat. Nos. 5,183,401; 5,232,351; 5,248,251; 5,250,489 and 5,259,754 to Dalla Betta et al., as well as U.S. Pat. No. 4,870,824 to Young et al. The catalyst structure may be fabricated from a metallic or ceramic substrate in the form of honeycombs, spiral rolls of corrugated sheet, columnar (or "handful of straws"), or other configurations having longitudinal channels or passageways permitting high gas space velocities with minimal pressure drops across the catalyst structure. For example, a spiral catalyst structure (26), such as that illustrated in FIGS. 2A and 2B, may suitably be used. The catalyst structure (26) is fabricated by crimping a sheet of metal foil (28) into a corrugated or wavy pattern with depressions (30) and ridges (32). The corrugated sheet of metal foil is then rolled together with a flat metal sheet (34) to form a large spiral (36) of alternate layers of corrugated foil (28) and flat sheet (34) as a generally cylindrical unit. The depressions and the ridges of the foil cooperate with the sheet to form a multiplicity of longitudinal passageways or channels (37). To prepare the catalytic structure, the corrugated and/or the flat sheets are typically coated on one or both sides with a platinum group metal, preferably palladium and/or platinum, prior to being rolled together to form the spiral catalyst structure (26).

While the illustrated catalyst structure (26) involves a metal foil corrugated in a straight channel structure combined with a flat foil, other suitable spiral catalyst structures include those obtained when two or more corrugated foils having straight or herringbone corrugation patterns are wound together in non-nesting fashion. The catalyst support structure of the present invention, as will be described in detail below, is particularly useful in the case of metal spiral catalyst structures since they have a tendency to telescope or deform in the direction of gas flow when exposed to high gas flow rates at temperatures which are sufficiently high, e.g., 1,000° C. or more, to soften or otherwise weaken the metal structure.

Figure 3:
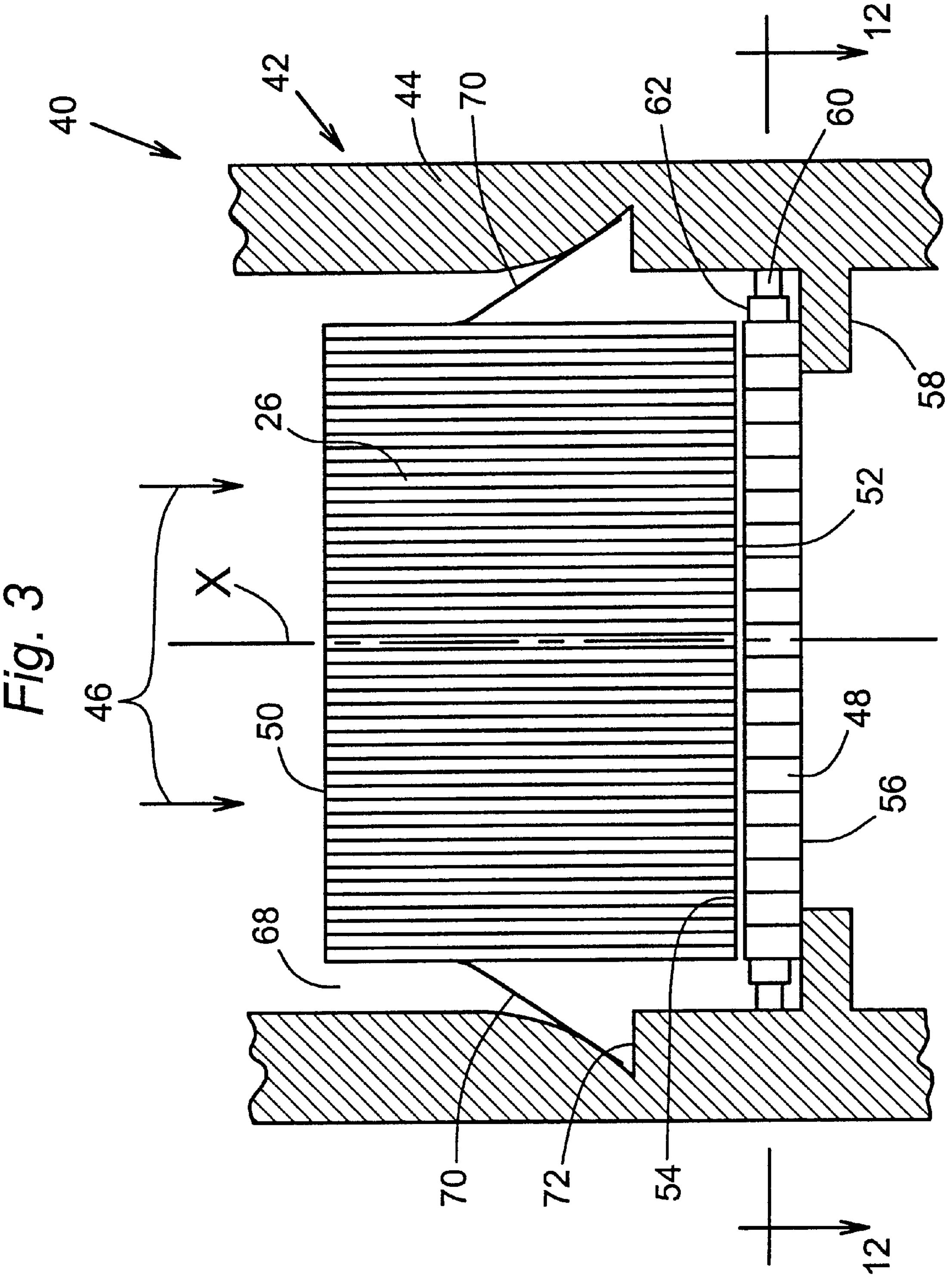
FIG. 3 is a schematic cross-section representation of a catalytic reactor, in accordance with the present invention.

Referring now to FIG. 3, there is shown a portion of a catalytic reactor, indicated generally at (40). The reactor includes a reaction chamber (42) defined by a generally cylindrical or tubular reaction chamber wall (44) defining a longitudinal axis X. A gaseous reaction mixture or gas flow, indicated by arrows (46), flows through the reaction chamber. A generally cylindrical monolithic open cellular or honeycomb-like support structure (48) is disposed in the reaction chamber for supporting a catalyst structure, such as the catalyst structure (26) illustrated in FIG. 2A. The catalyst structure (26) has an inlet end (50) and an outlet end (52). The support structure (48) has an inlet end (54) and an outlet end (56). The catalyst structure and the support structure are positioned within the reaction chamber so that the outlet end (52) of the catalyst structure abuts against the inlet end (54) of the support structure. The support structure is retained and secured in the reaction chamber by means of an annular lip or ridge (58) extending radially inwardly from the wall (44) of the reaction chamber. The annular ridge (58) forms a ledge on which the outside or peripheral edge of the support structure sits or rests, thereby limiting the movement of the support structure along the longitudinal axis. In this manner, any axial load placed on the support structure by the gas flow (46) through the catalyst structure is transferred from the support structure to the wall (44). As will be explained in detail below, the support structure is centered within the reaction chamber by a plurality of cooperating struts (60) and splines (62).

Figure 4:
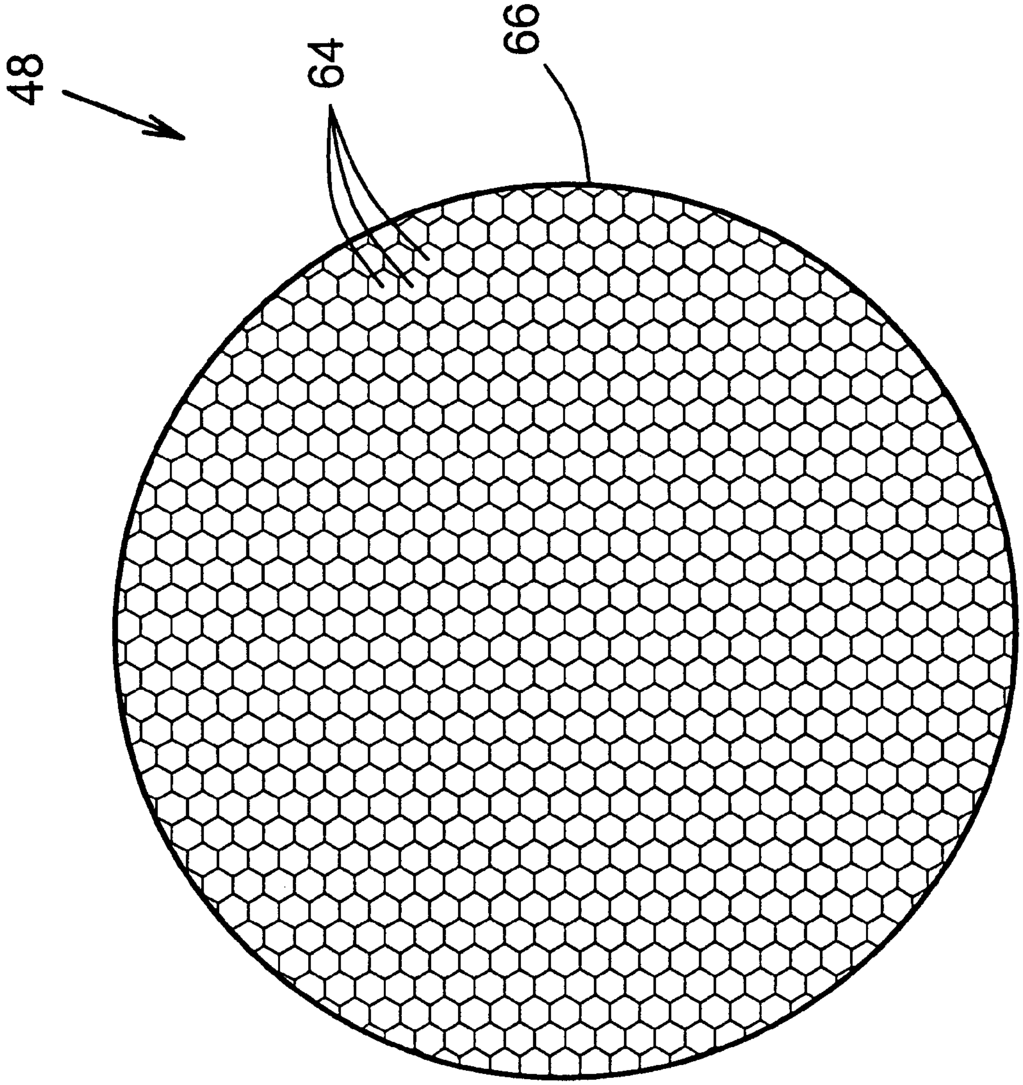
FIG. 4 is a schematic end view of the honeycomb or open-cellular support retaining structure illustrated in FIG. 3.

The support structure (48) can be any suitable monolithic open cellular structure, such as that described in the co-pending application, U.S. Ser. No. 08/462,639, entitled "Improved Support Structure For A Catalyst", which is incorporated by reference herein. The support structure can be constructed or fabricated by any conventional technique for forming monolithic honeycomb-like structures or cells, made up of strips or ribs of ceramic or metallic material bonded together to form a unitary structure. For example, the support structure can be cast as a single unit in the appropriate mold, or the structure can be formed by bonding together a series of strips or ribs which have been previously molded or bent to afford the desired cellular opening configuration when they are bonded together. As shown in FIG. 4, the support structure (48) has a multiplicity of cellular openings or passageways (64) extending in an axial direction parallel to the gas flow (46). Although the cellular openings are shown as being hexagonal in shape, the openings can have any suitable shape, such as circular, triangular, or trapezoidal. The support structure can include a circular outer band (66) which frames the peripheral surface of the support structure.

The cross-sectional area of the catalyst structure (26), as taken in a direction perpendicular to longitudinal axis of the reactor, is sized to be less than the cross sectional area of the reaction chamber wall (44) such that a gap or an annular space (68) exists therebetween. This annular space is sized to accommodate the thermal expansion of the catalyst structure (26) and the support structure (48) which occurs on contact with the high temperature gas flow. The catalyst structure is positioned coaxially within the reaction chamber by a plurality of flexible flanges (70). The flanges extend from an annular groove (72) formed in the inner surface of the reaction chamber wall (44) to the outer peripheral surface of the catalyst structure. Preferably, the plurality of flanges overlap one another and extend around the entire circumference of the catalyst structure to substantially block the flow of gas which would otherwise by-pass the catalyst structure through the annular space.

Figure 5:
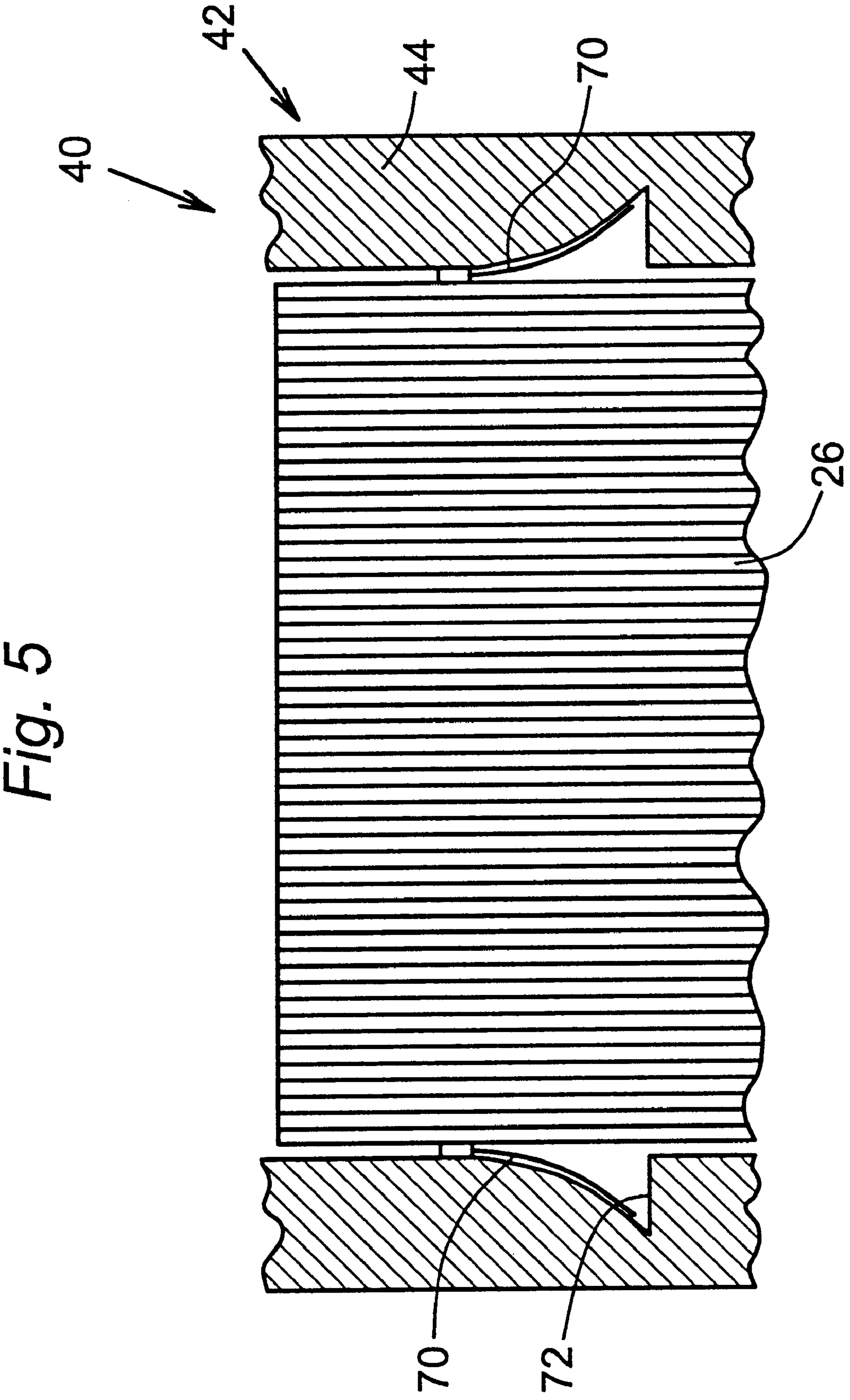
FIG. 5 is a schematic representation of a portion of the catalytic reactor illustrated in FIG. 3, wherein the catalytic structure has thermally expanded in an outwardly radial direction towards the reaction chamber wall.

The flanges (70) are sufficiently flexible so the flanges will bend as the catalyst structure thermally expands, as illustrated in FIG. 5, without placing enough stress on the catalyst structure to cause localized deformation of the catalyst structure at the points where the flanges contact the outer wall of the catalyst structure. The flanges can be made of any suitable flexible material having a relatively high elasticity, such as spring steel alloys, iron base alloys, stainless steels, cobalt and nickel based alloys, and pure metals such as aluminum or nickel. For high temperature applications, an oxidation resistant alloy, such as an FeCrAl alloy, may be desirable. If desired, the flanges can be coated with aluminum to provide high temperature oxidation resistance.

In addition to sealing the annular space, the plurality of flanges (70) radially center the generally cylindrical catalyst structure with respect to the cylindrical reaction chamber wall so they generally share a common axis. If the support structure is also radially centered, both the catalyst structure and the support structure will thermally expand in a radially outwardly direction from their respective centers. This simultaneous radial thermal expansion helps reduce the amount of lateral movement between the outlet end (52) of the catalyst structure (26) and the inlet end (54) of the support structure (48), thereby reducing the scraping or frictional relative movement therebetween. This helps prevent damage to the catalyst foils of the catalyst structure.

Figure 6:
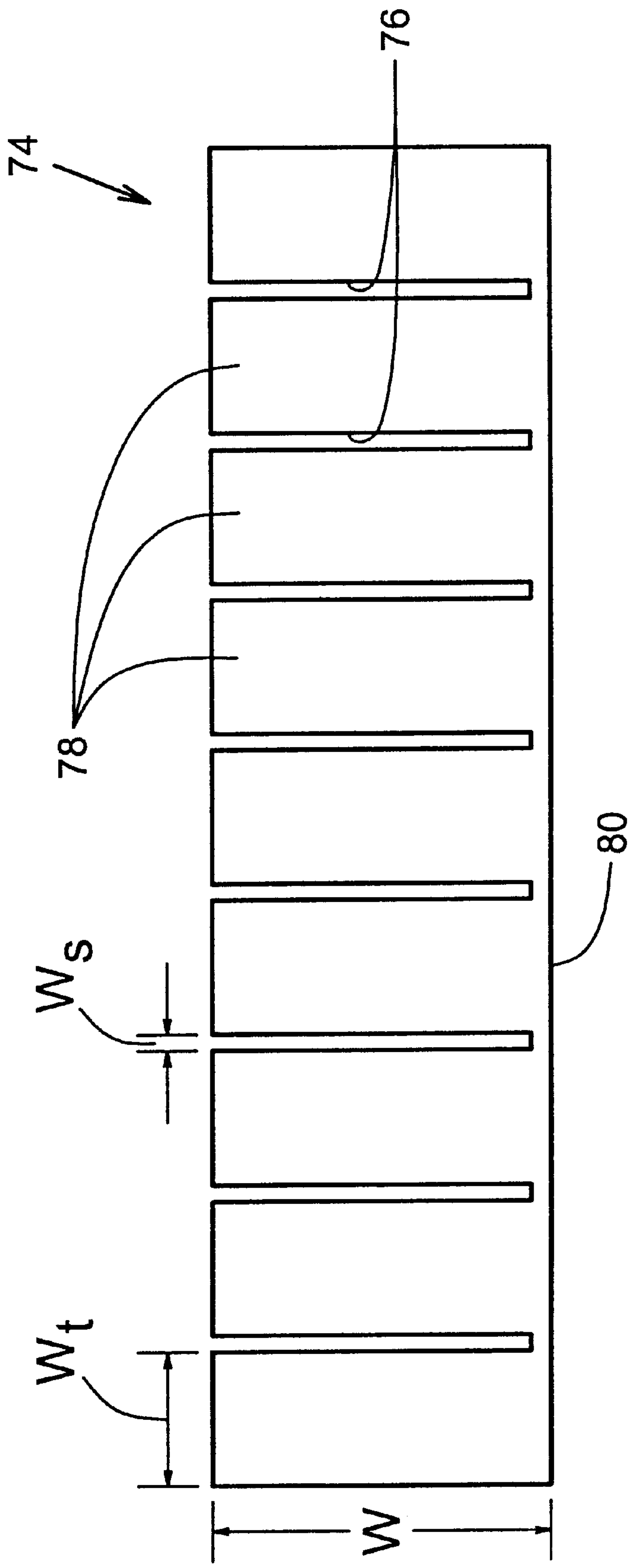
FIG. 6 is a front elevational view of a strip which is used to form the flanges illustrated in FIG. 3.

The plurality of flanges can be separate components or can be formed from a single strip (74,) such as shown in FIG. 6. The strip has a plurality of slots (76) formed therethrough, thereby forming a plurality of tabs (78) which function as the flanges (70). Preferably, the slots extend just short of the entire width of the strip, such that the strip has an intact edge (80). The strip (74) is positioned within the combustion chamber so that the intact edge (80) is attached to the outer peripheral surface of the catalyst structure. Once installed, the strip is formed into a conical shape so that the diameter of the intact edge is larger than the diameter formed by the ends of the tabs.

As shown in FIG. 6, the strip (74) has a width W, which corresponds to the length of the flanges (70). The width W of the strip (74) is sized to accommodate the diameter of the catalyst structure relative to the diameter of the reaction chamber. For applications where the annular space is relatively large, the width W should be large enough to provide relatively large radial movement of the tabs (78) to maintain contact with the catalyst structure. In the case of catalyst structures which are typically used in catalytic combustion, the width W of the strip is suitably within the range of from about 1 inch to about 4 inches, and preferably within the range of from about 1.5 inches to about 4 inches.

The tabs have a width $W_t$ which is preferably sized so as to maintain a good sealing contact with the catalyst structure. For example, for relatively small diameter catalyst structures, the width $W_t$ of tabs is preferably relatively short so that the flat edge of the tab contacting the curvature of the outer diameter of the catalyst structure provides a generally tight seal. For larger diameter catalyst structures, the width Wt of the tabs can be larger since the outer diameter of the catalyst structure has less of a curvature. For a catalyst structure having an outer diameter of 3 to 5 inches, the width $W_t$ of the tabs is preferably within the range of from about 0.1 inches to about 0.3 inches. For a catalyst structure having an outer diameter of 10 to 20 inches, the width $W_t$ of the tabs is preferably within the range of from about 0.25 inches to about 1.0 inch.

The slots (76) have a width $W_s$ which is preferably sized so as to be narrow enough to minimize the leakage of bypassing air between the slots. A preferred range for the width $W_s$ of the slots is within the range of from about 0.0001 inches to about 0.030 inches, and more preferably within the range of from about 0.001 inches to about 0.020 inches.

The thickness of the strip and the tabs should be sufficiently thick so as to provide a reasonable sealing force against the outer diameter of the catalyst structure. However, the thickness of the strip should also be sufficiently thin so that the force will not cause localized deformation of the catalyst structure at the points where the flanges contact the outer wall of the catalyst structure, especially since the catalyst structure can be operating at high temperatures and may not have relatively high tensile strength.

Figure 7A:
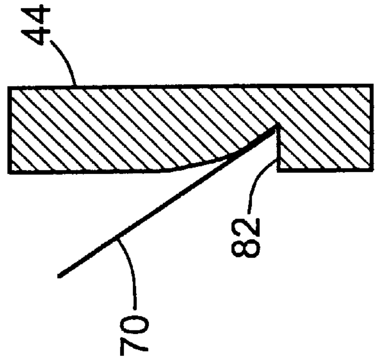
FIGS. 7A through 7D depict partial sectional views of various configurations of the annular groove formed in the reaction chamber wall and used to retain the flanges.
Figure 7B:
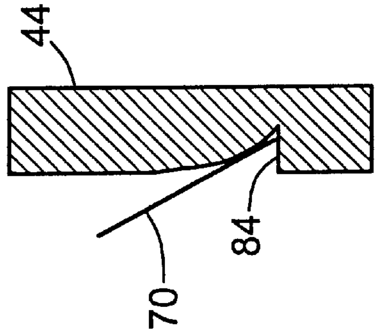
Figure 7C:
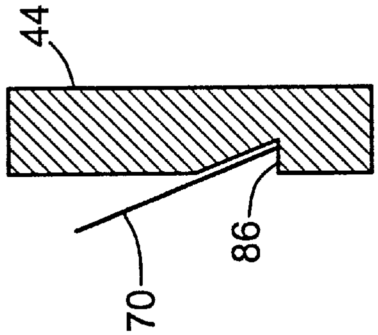
Figure 7D:
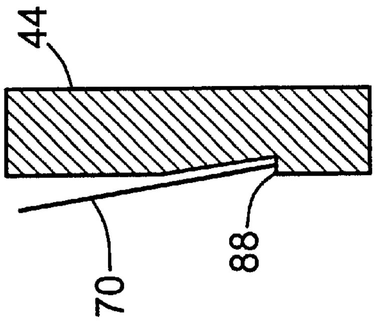

Referring now to FIGS. 7A through 7D, the annular groove (72) formed in the reaction chamber wall (44) can have any suitable cross-sectional shape which retains the end of the flange. For example, as shown in FIGS. 7A, a groove (82) is formed in the wall having a curvilinear shaped contact profile which contacts the face of the flange. The curvilinear shape helps to minimize the stress placed on the deformed flange during thermal expansion of the catalyst structure. As shown in FIG. 7B, for flanges having a shorter length the arcuate length of the curvilinear shaped profile of a groove (84) can be shortened. However, the contact profile of the annular groove does not have to be curvilinear, but may be straight, such as the contact profiles of the grooves (86) and (88), as shown in FIGS. 7C and 7D, respectively. Note that the groove (86) positions the flange (70) at a more severe angle with respect to the outer surface of the catalyst structure than the groove (88) to accommodate a larger width of the annular space, for example.

Figure 8:
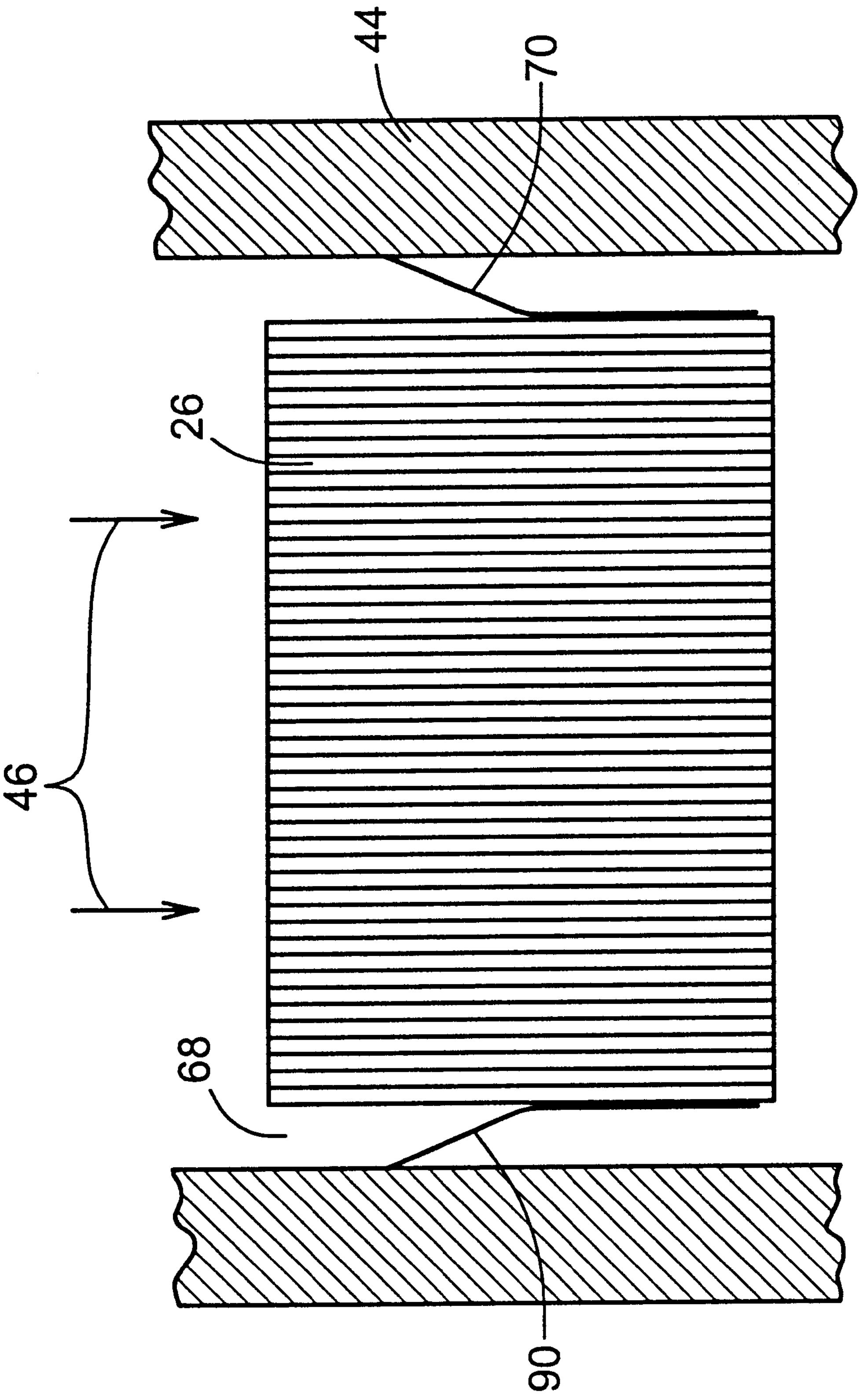
FIG. 8 is a schematic representation of a catalytic reactor, illustrating a different configuration of flanges.
Figure 9:
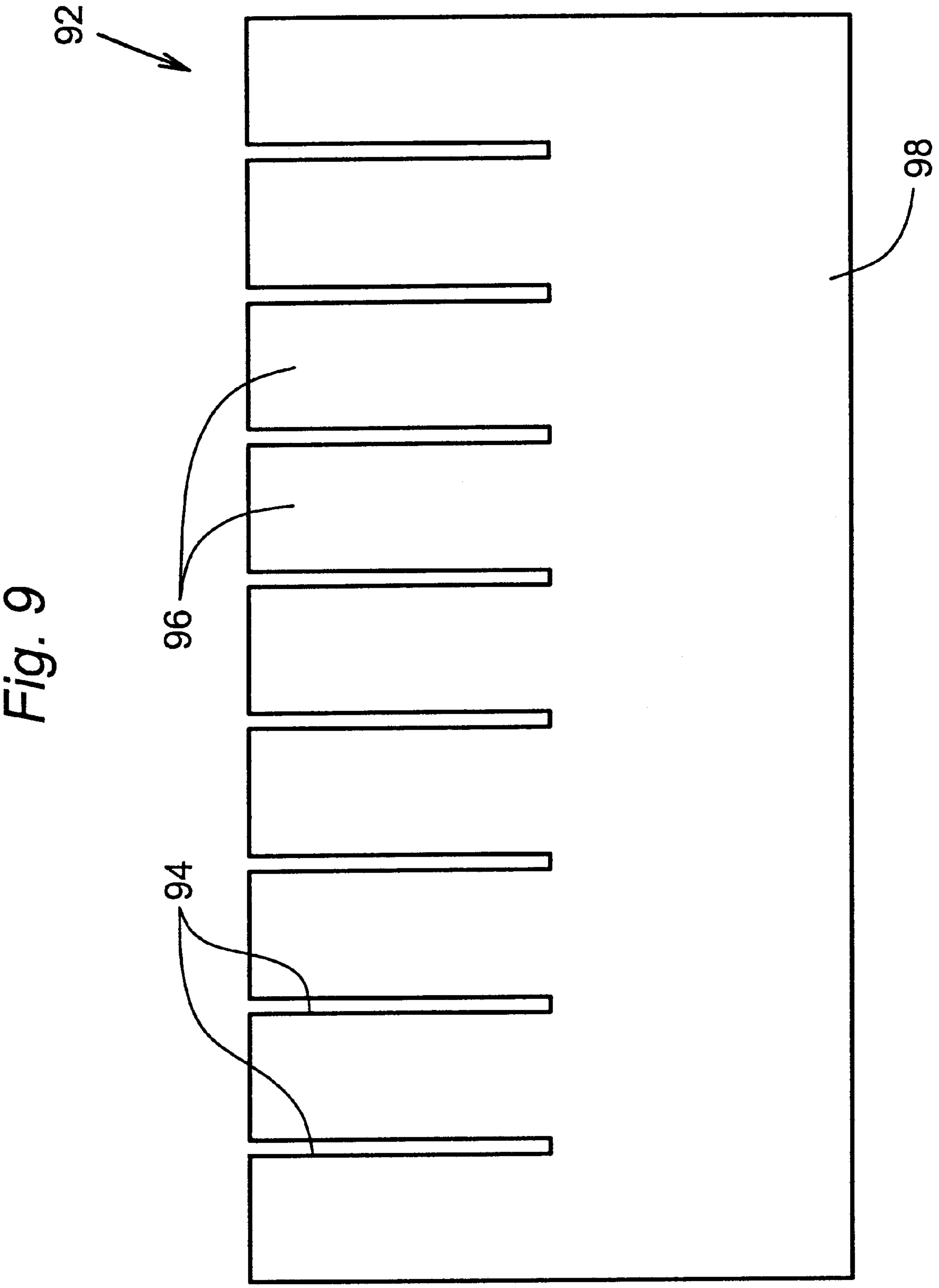
FIG. 9 is a front elevational view of a strip which is used to form the flanges illustrated in FIG. 8.

There is illustrated in FIG. 8, a catalyst structure (26) having a plurality of flanges (90) which are positioned about the outer surface of the catalyst structure. The flanges (90) provide the same functions as the flanges (70), e.g., accommodating the thermal expansion of the catalyst structure, radially centering the catalyst structure with respect to the reaction chamber wall, and providing a sufficient seal for the annular space between the inner surface of the reaction chamber wall (44) and the outer peripheral surface of the catalyst structure. As shown in FIG. 9, the flanges (90) can be formed from a strip (92), similar to the strip (74) of FIG. 6. The strip has a plurality of slots (94) formed therethrough, thereby forming a plurality of tabs (96) which function as the flanges (90). An unslotted portion (98) is wrapped around the periphery of the catalyst structure and preferably fastened thereto. The strip can be fastened by any suitable method, such as by bonding or spot welding the unslotted portion to the outer periphery of the catalyst structure. The strip (92), however, does not necessarily have to be fastened to the catalyst structure. For example, the edge of the unslotted portion can be positioned adjacent the outlet end of the catalyst structure so that the support structure supports the strip (92).

Figure 10:
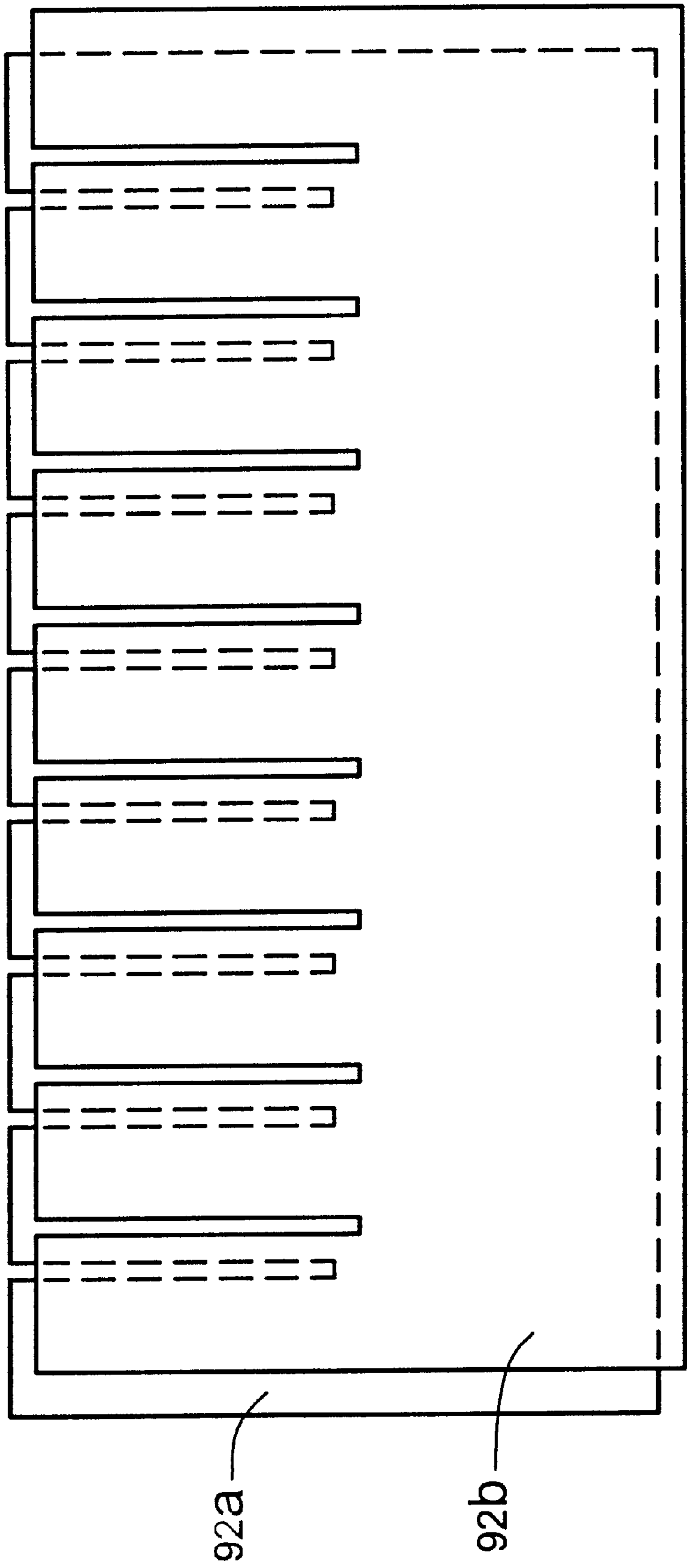
FIG. 10 is a front elevational view of a pair of overlapping strips which can be used to form overlapping flanges.

The tabs (96) are deformed outwardly to engage the inner wall of the reaction chamber. Since the tabs are deformed outwardly, the slots are opened creating a slight gap therebetween. To provide an improved seal, a pair of overlapping strips **(92*a*) and (92*b*) can be used, as shown in FIG. 10**. The overlapping strips are positioned so that tabs of one strip are laid across the slots of the other strip.

Figure 11A:
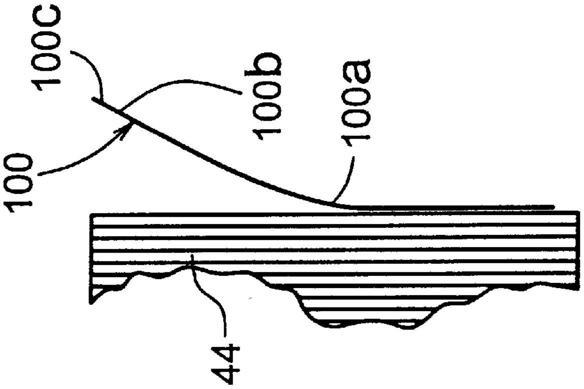
FIGS. 11A through 11D depict partial sectional views of various profiles of flanges for use in the catalytic reactor of FIG. 8.
Figure 11B:
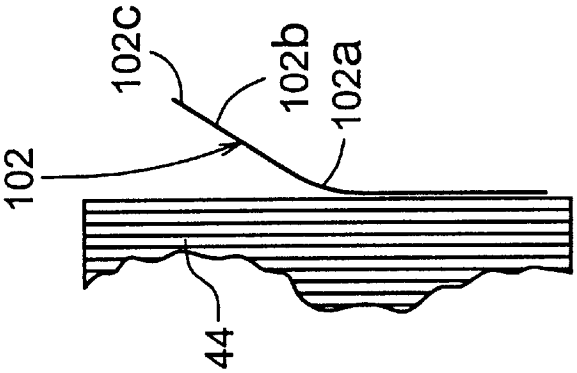
Figure 11C:
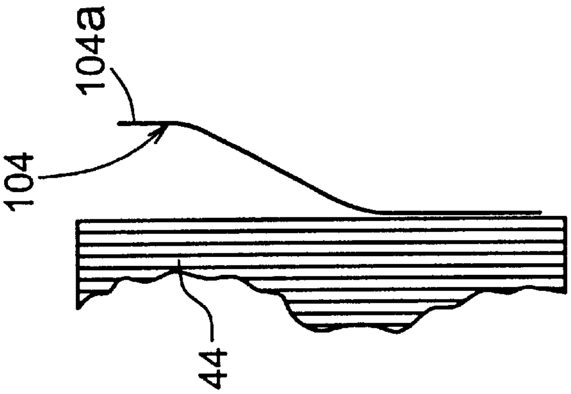
Figure 11D:
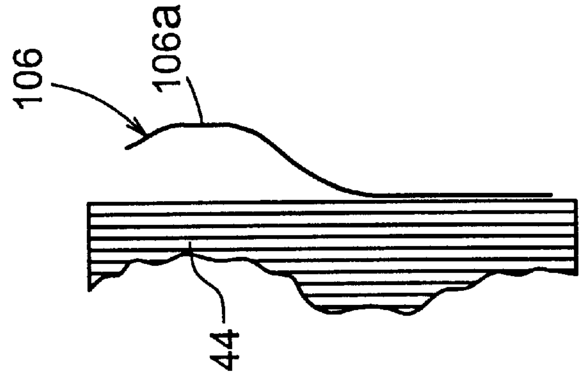

The tabs (96) can be bent to any suitable shape which provides a good seal between the catalyst structure and the support structure. In this regard, FIGS. 11A through 11D illustrate different suitable shapes for the tabs (96). FIGS. 11A and 11B show tabs (100) and (102) having bent portions **(100*a*) and (102*a*) and straight portions (100*b*) and (102*b*), respectively. The straight portions (100*b*) and (102*b*) end at edges (100*c*) and (102*c*), respectively, which contact the inner wall of the reaction chamber at a sharp line contact. As shown in FIG. 11C, a tab (104) has an axially extending portion (104*a*) which has a larger contact surface area for possible improved sealing. Also, the axially extending portion (104*a*) is less likely to bind on the reaction chamber wall than the sharp edges (100*c*) and (102*c*) of the tabs (100) and (102) when the catalyst structure thermally expands in the inlet direction. As shown in FIG. 11D, a tab (106) has a generally rounded portion providing a larger contact area and having even a lessor chance of binding than the tab (104) of FIG. 11C**.

Although the flanges (70) and (90) have been described as being used in cooperation with the catalyst structure, flanges can also be used in cooperation with the support structure.

Figure 12:
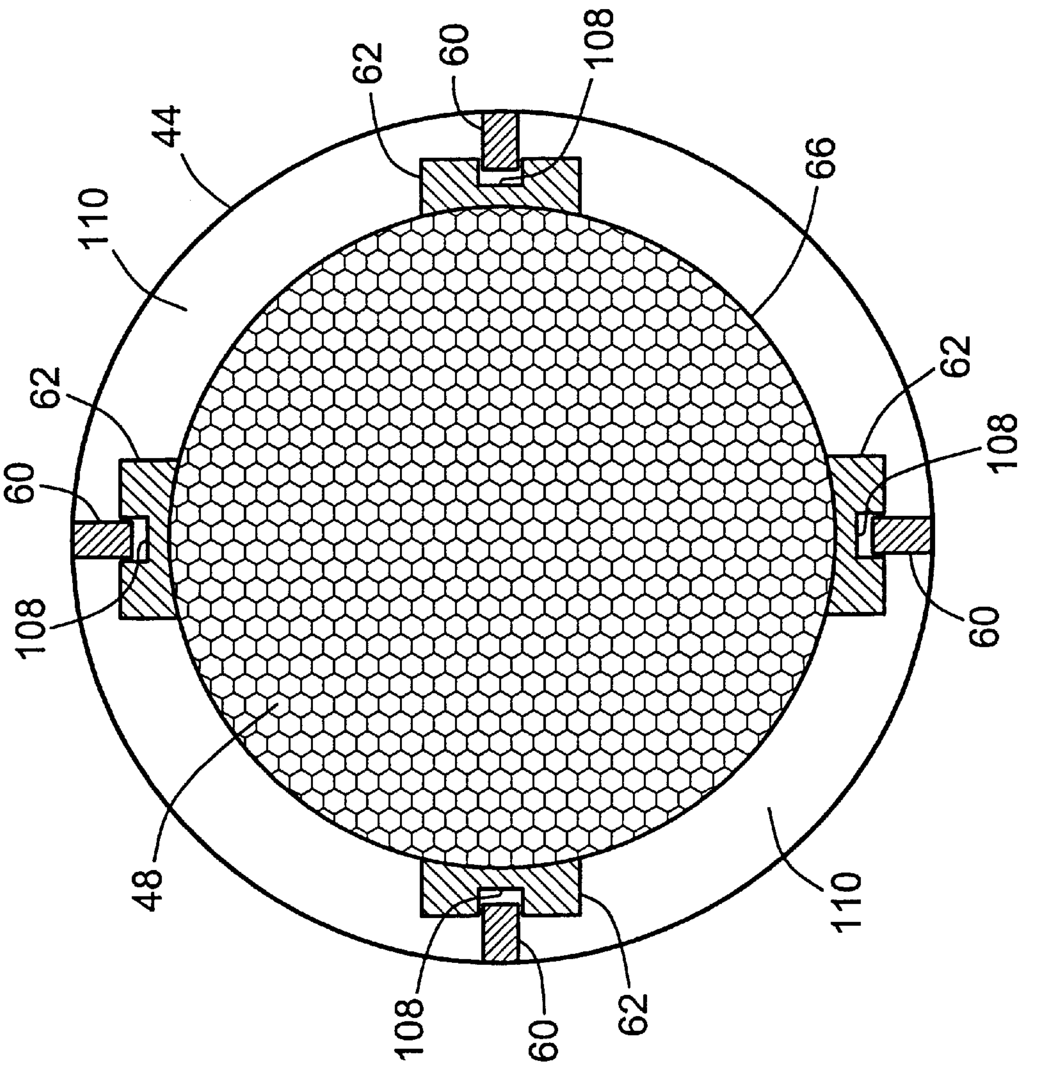
FIG. 12 is a sectional view taken along lines 12—12 of FIG. 3, illustrating the radial centering assembly for the support retaining structure.

Referring now to FIG. 12, there is shown the support structure (48) disposed within the reaction chamber wall (44) and retained by the plurality of the cooperating struts (60) and splines (62) defining a radial centering assembly. In the embodiment shown in FIG. 12, struts (60) are fastened to inner surface of the reaction chamber wall. The splines (62) are fastened to support structure (48), and are preferably attached to the circular band (66) which frames the peripheral surface of the support structure. Each spline (62) has a radially extending groove (108) formed therein for receiving the associated strut. The radial height of the grooves and the struts is sized to allow for thermal expansion of the support structure relative to the thermal expansion of the reaction chamber wall. Thus, when the support structure and the reaction chamber wall are not exposed to high temperatures, a gap exists between the bottom of the grooves and the edge of the strut, as shown in FIG. 12. The splines and struts cooperate to radially center the support structure within the reaction chamber wall to define an annular space (110) between the outer periphery of the support structure and the inner surface of the reaction chamber wall. Thus, the width of the annular space (110) is substantially the same around the entire periphery of the support structure. For example, when viewing FIG. 12, the upper and lower struts and splines generally prevent the support structure from moving in a leftward or rightward direction. Similarly, the left-hand and right-hand struts and splines generally prevent the support structure from moving in an upward or downward direction. In other words the struts and splines prevent the support structure from rotating in a circumferential direction but allow the support structure to thermally expand radially outwardly so that as the support structure expands, the struts advance further into the grooves of the splines. It is advantageous to radially center the support structure, as well as the catalyst structure, to help reduce the amount of relative lateral movement between the outlet end of the catalyst structure and the inlet end of the support structure to reduce the scraping therebetween which can damage the catalyst foils.

Figure 13:
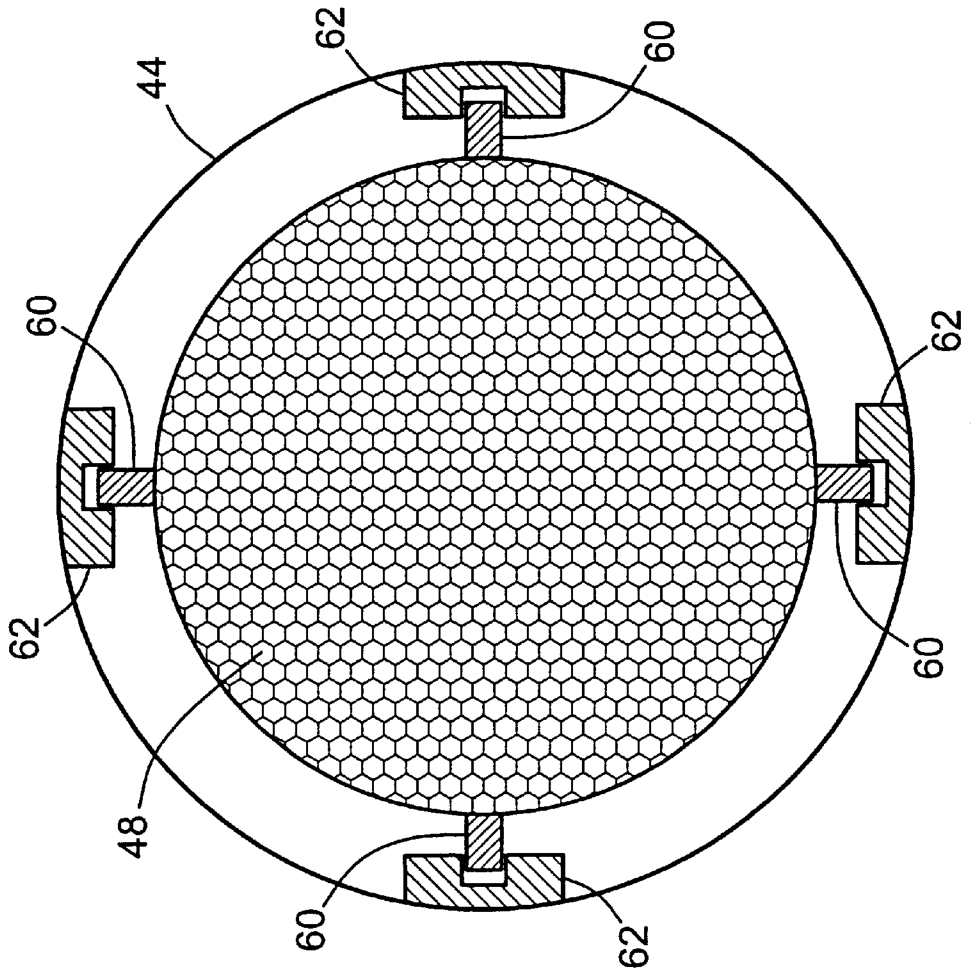
FIGS. 13 through 15 are sectional views depicting alternate embodiments of radially centering assemblies for both the support retaining structure and the catalyst structure.

Although the embodiment of the support structure illustrated in FIG. 12 has four cooperating struts and splines, it should be understood that any number of struts and splines greater than one can be used. Preferably, the cooperating struts and splines are equally spaced about the perimeter of the support structure. If desired, the struts and splines can be reversed, with the struts (60) fastened to the support structure (48), and the splines (62) fastened to the reaction chamber wall (44), as shown in FIG. 13. The arrangement of the struts and splines may also be alternated so that adjacent cooperating struts and splines have a reversed orientation.

Figure 15:
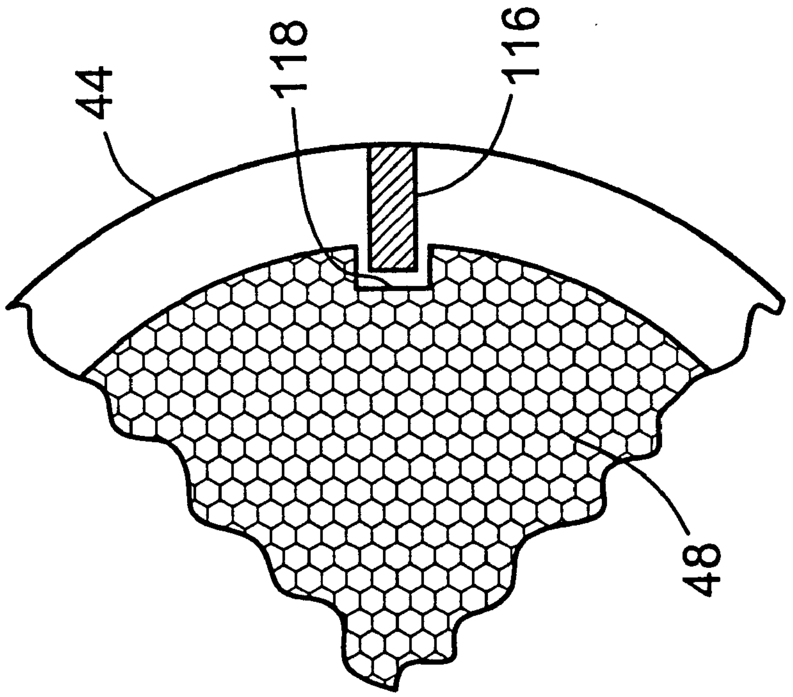
Figure 14:
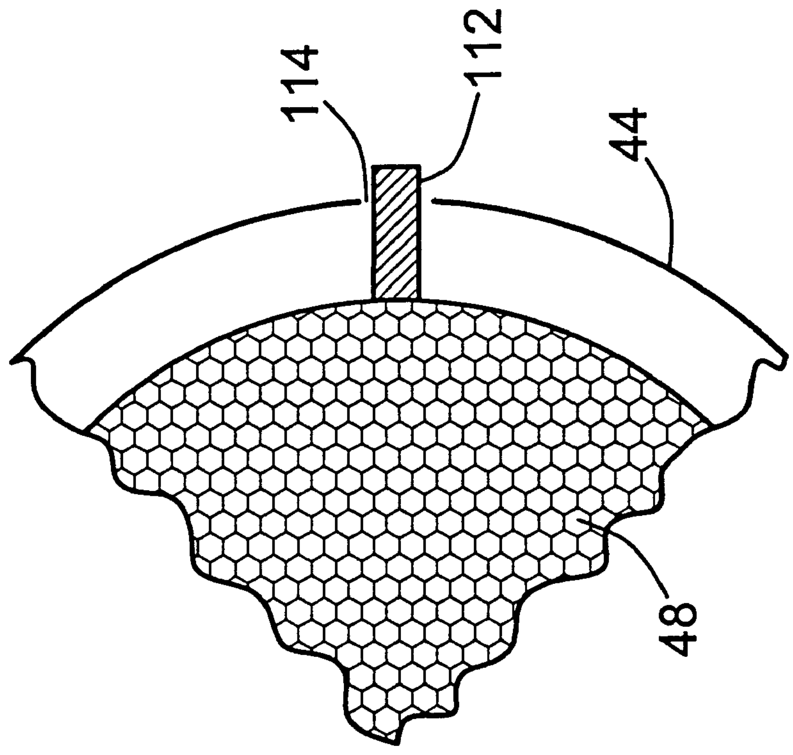

Referring to FIG. 14, there is shown an alternate embodiment of a radial centering assembly for the support structure (48) and the reaction chamber wall (44). A stud or pin (112) extends outwardly from the support structure and is slidably disposed within a slot (114) formed in the reaction chamber wall. The pin and the slot cooperate in a similar manner as the struts (60) and the splines (62), as described above and are considered to be equivalents thereof. Yet another embodiment of a radial centering assembly is illustrated in FIG. 15. A stud or pin (116) extends radially inwardly from the reaction chamber wall and is slidably disposed within a slot (118) formed in the support structure. If the catalyst structure were ceramic, for example, the slot (118) could be cut into the ceramic catalyst structure.

Although the struts and splines have been described as being used in conjunction with the support structure, it should be understood that the strut and spline arrangement can also be used with the catalyst structure (26).

Figure 16:
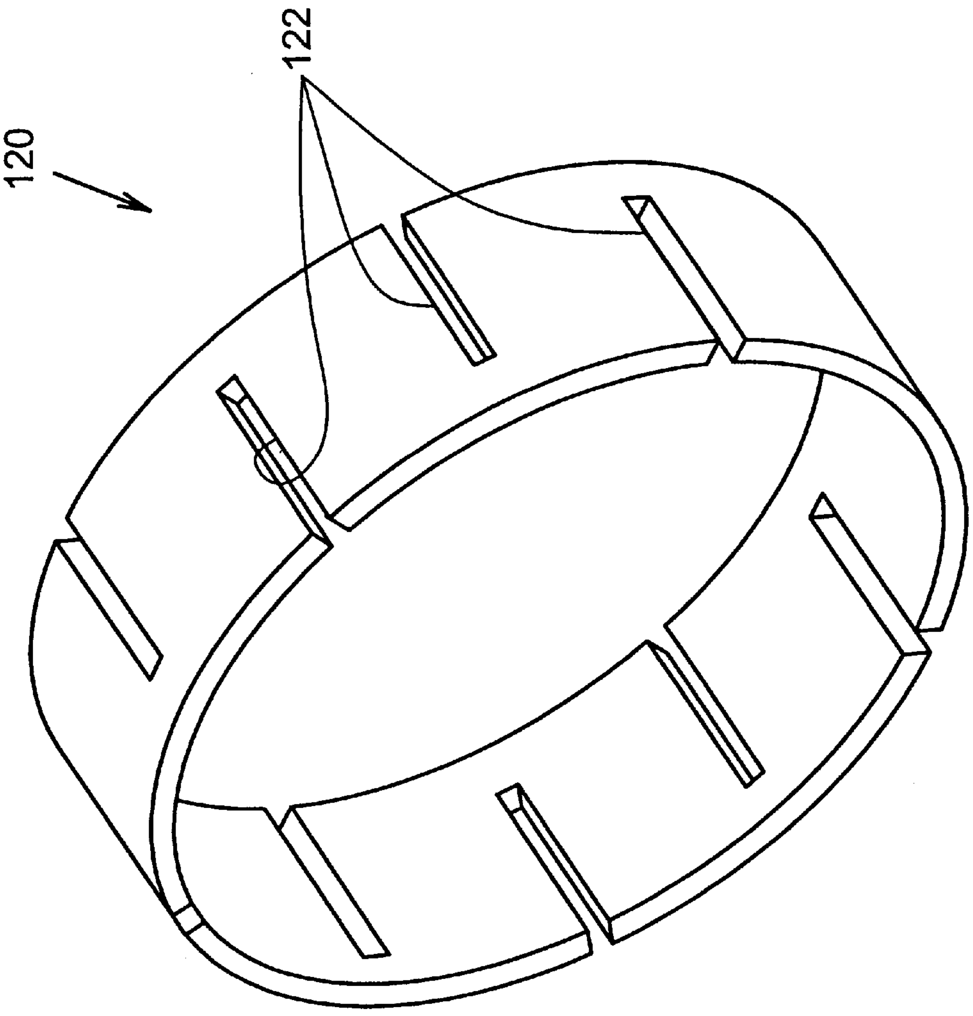
FIG. 16 is a perspective view of an outer band for framing a monolithic open cellular support retaining structure.

In certain circumstances, it may be desirable for the support structure to have a circular outer band having a thickness which is greater than the walls of the cells of the open cellular monolithic support structure. The outer and can be made of any suitable material, such as metal. The thicker metal and would provide strength for attachment points, such as for the struts or splines described above. The thicker metal band would also provide strength in the axial direction for multiple catalyst structures. However, because the metal band has a larger thickness than the cell walls of the support structure, the cell walls would thermally expand at a greater rate than the band. Thus, as a result of the expansion the cell walls could be deformed and damaged. To compensate for this rate of thermal expansion, the outer band may have a plurality of slots formed therein to allow the outer band to flex. For example, there is illustrated in FIG. 16, an outer band (120) having a plurality of slots (122) formed therein. The slots (122) can be formed in an alternating pattern spaced around the circumference of the outer band such that adjacent slots are formed through opposite edges, as shown in FIG. 16. The outer band should have sufficient flexibility to absorb the thermal expansion of the cell walls of the support structure without causing the cell walls to deform, yet strong enough to provide rigidity to the support structure. The slots are sized so as to minimize gas flow leakage therethrough. For the support structures of the present invention, the width of the slots is suitably within a range of from about 0.001 inches to about 0.050 inches, and preferably within a range of from about 0.002 inches to about 0.020 inches. The slots are spaced apart from one another to provide enough relaxation while maintaining the integrity of the outer band. The arc length between the slots is suitably within the range of from about 0.5 inches to about 6 inches, and preferably within the range of from about 1 to 3 inches.

Although the outer band (120) was described in cooperation with the support structure, an outer band having similar features as the outer band (120) can be used with catalyst structure of the present invention.

Figure 17:
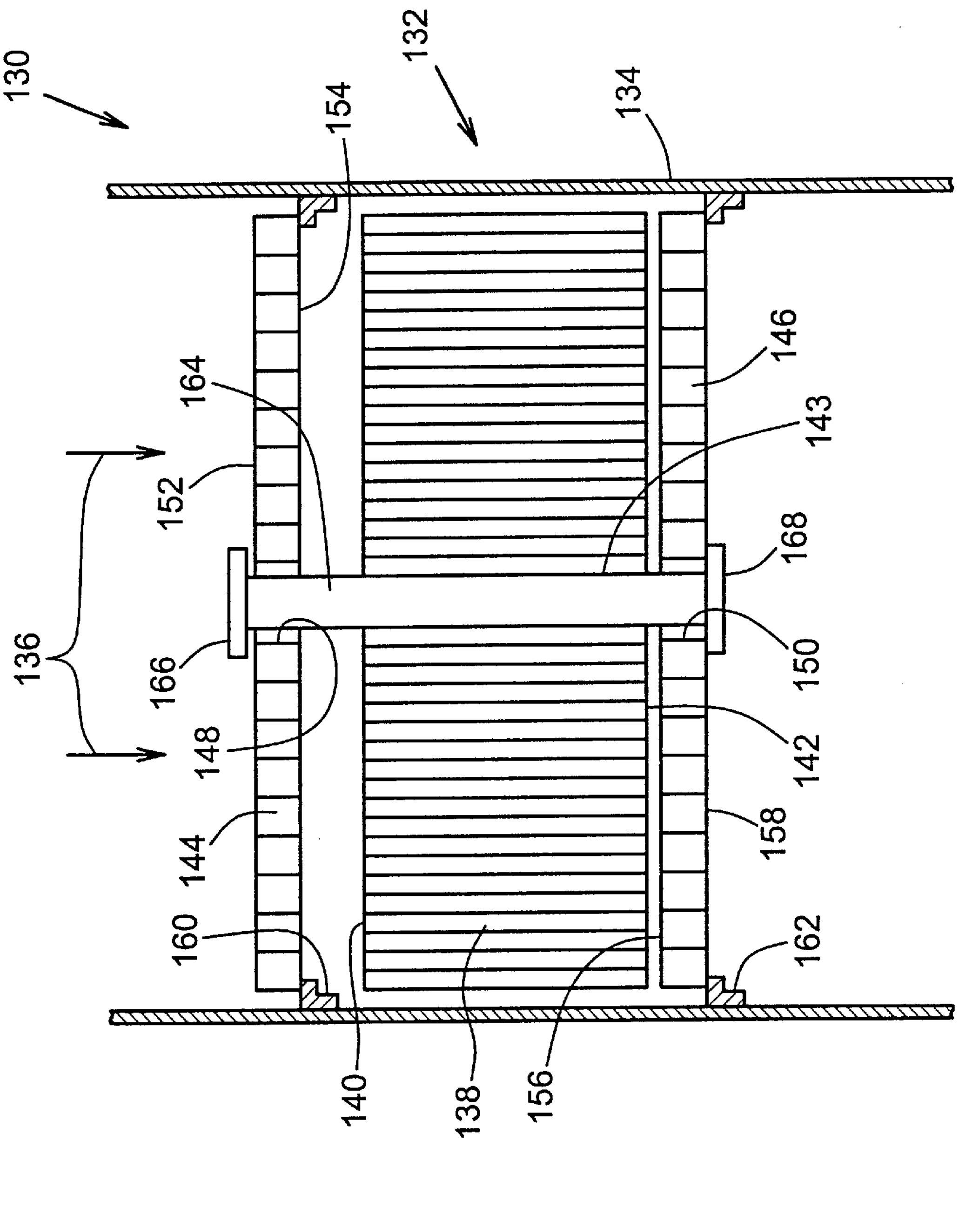
FIG. 17 is a schematic representation of an alternate embodiment of a catalytic reactor having a center support member, in accordance with the present invention.

Referring now to FIG. 17, there is illustrated an alternate embodiment of a catalytic combustion reactor, indicated generally at (130). The reactor includes a reaction chamber (132) defined by a generally cylindrical reaction chamber wall (134). A gaseous reaction mixture or gas flow, indicated by arrows (136), flows through the reaction chamber. The reactor further includes a catalyst structure (138), which can be similar to the catalyst structure (26) of FIG. 3. The catalyst structure (138) has an inlet end (140) and an outlet end (142). The catalyst structure has an axial bore (143) formed therethrough which extends between the inlet and outlet ends. The catalyst structure is retained in the chamber by inlet and outlet monolithic open cellular support structures (144) and (146). The support structures (144) and (146) can be similar to the support structure (48) of FIG. 3. The inlet and outlet support structures (144) and (146) have axial bores (148) and (150), respectively, formed therethrough. The inlet support structure (144) has an inlet end (152) and an outlet end (154). The outlet support structure (146) has an inlet end (156) and an outlet end (158). The inlet and outlet support structures (144) and (146) are retained in the reaction chamber by abutting against inwardly extending annular ridges (160) and (162), respectively, extending radially inwardly from the wall (134) of the reaction chamber. A center support member (164) is disposed within the axial bores of the catalyst structure and the inlet and outlet support structures. The center support member (164) has radially outwardly extending flanges (166) and (168) formed on the ends thereof. The flange (166) abuts against the face of the inlet end of the inlet support structure. The flange (168) abuts against the face of the outlet end of the outlet support structure.

The primary function of the center support member (164) is to transfer a portion of the force or axial load acting on the outlet support structure to the inlet support structure. More specifically, the flow of gas (136) exerts an axial load on the outlet support structure. Since the outlet support structure is supported about its perimeter by the ridge (162), the center portion of the outlet support structure is biased outward by this axial force. The force acting on the center of the outlet support structure is transferred to the center support member (164) via the flange (168). The force acting on the center support member is transferred to the center portion of the inlet support structure via the flange (166). Note that the forces acting on the perimeter of the inlet support structure are transferred to the reaction chamber wall via the ridge (160). The inlet support structure, therefore, assists in supporting the outlet support structure by means of the center support member.

The outlet support structure is typically carrying a heavier load than the inlet support structure since the outlet support structure is positioned in an area of the combustion chamber having higher velocity gas flow and a larger pressure drop. In addition, the outlet support member is positioned in an area of the combustion chamber having a higher temperature, and thus the outlet support structure will have less strength than the inlet support structure. Also, the support structure supports the catalyst support member. The advantage of having the center support member is that the outlet support structure is supported at the center instead of just its perimeter portion, thereby improving the structural integrity of the outlet support structure.

Figure 18:
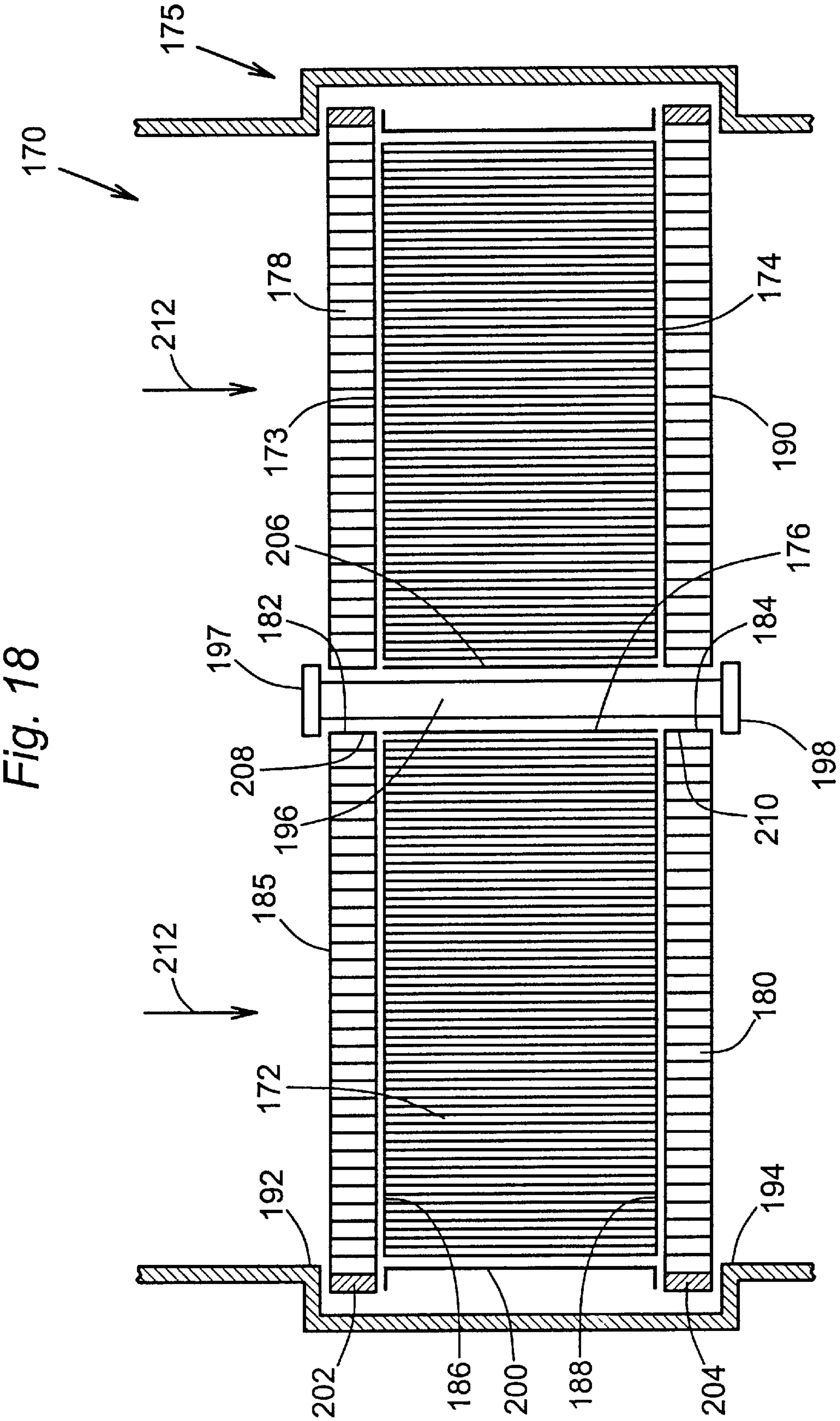
FIG. 18 is a schematic representation of another alternate embodiment of a catalytic reactor having a center support member, in accordance with the present invention.

Referring now to FIG. 18, there is illustrated another alternate embodiment of a catalytic combustion reactor, indicated generally at (170), which is similar to the reactor (130) of FIG. 17. The reactor (170) has a catalyst structure (172) having an inlet end (173) and an outlet end (174). The catalyst structure (172) is disposed within a cylindrical wall of a reaction chamber (175). The catalyst structure also has an axial bore (176) formed therethrough which extends between the inlet and outlet ends. The catalyst structure is retained in the chamber by inlet and outlet monolithic open cellular support structures (178) and (180). The inlet and outlet support structures (178) and (180) have axial bores (182) and (184), respectively, formed therethrough. The inlet support structure (178) has an inlet end (185) and an outlet end (186). The outlet support structure (180) has an inlet end (188) and an outlet end (190). The inlet and outlet support structures (178) and (180) are retained in the reaction chamber by abutting against inwardly extending shoulders (192) and (194), respectively, extending radially inwardly from the wall of the reaction chamber. The catalyst support structure and the inlet and outlet support structures are sandwiched between the shoulders (192) and (194) such that the catalyst structure is positioned between the inlet and outlet support structures. A center support member (196) is disposed within the axial bores of the catalyst structure and the inlet and outlet support structures. The center support member (196) has radially outwardly extending flanges (197) and (198) formed on the ends thereof. The flange (197) abuts against the face of the inlet end of the inlet support structure. The flange (198) abuts against the face of the outlet end of the outlet support structure.

The catalyst support structure and the inlet and outlet support structures may have thick walled metal outer metal rings or bands (200), (202), and (204), respectively, formed thereabout to provide additional strength at the perimeters thereof. The catalyst support structure and the inlet and outlet support structures may also have thick walled tubes (206), (208), and (210) which line the axial bores (176), (182), and (184), respectively, to provide additional strength at these regions.

This configuration of the catalytic combustion reactor (170) provides support for any reverse flow load, in the direction opposite the normal flow of gas (212), which may occur in the reaction chamber. In this scenario, the gas flow load will force the catalyst structure and the inlet and outlet structures against the shoulder (192).

The various support members of the present invention, as described above, can be used in a process for the catalytic combustion of a hydrocarbonaceous or other combustible fuel, e.g., methane, ethane, $H_2$ or $CO/H_2$ mixtures. In this process, an oxygen-containing gas, such as air, is mixed with the hydrocarbonaceous fuel to form a combustible oxygen/fuel mixture. This oxygen/fuel mixture is passed as a flowing gas through a monolithic catalyst structure that is positioned within a reaction chamber to combust the oxygen/fuel mixture and form a hot, partially or completely combusted, gas product.

A variety of catalyst structures can be used in this process. For example, a catalyst having integral heat exchange surfaces as described in U.S. Pat. No. 5,250,489 entitled "Catalyst Structure Having Integral Heat Exchange", or a graded palladium-containing partial combustion process catalyst as described in U.S. Pat. Nos. 5,248,251 and 5,258,349 both entitled "Graded Palladium-Containing Partial Combustion Catalyst And Process For Using It", may be used in this invention. In addition, the process may involve complete combustion of the fuel or partial combustion of the fuel as described in the co-pending application, U.S. Ser. No. 08/088,614, entitled "Process For Burning Combustible Mixtures". Furthermore, the process may be a multi-stage process in which the fuel is combusted stepwise using specific catalysts and catalyst structures in the various stages, as described in U.S. Pat. No. 5,232,357, entitled "Multistage Process For Combusting Fuel Mixtures Using Oxide Catalyst In The Hot Stage". The above six patents and one patent application are herein incorporated by reference.

This process also involves stabilizing and radially centering the position of the catalyst structure and a monolithic open cellular support structure which prevents axial movement of the catalyst structure. The catalyst structure can be made up of a multiplicity of longitudinally disposed channels, wherein the channel walls are formed by a thin metal substrate which expands on exposure to the heat generated in the high temperature reaction. The channels have inlet and outlet ends for passage of a flowing reaction gas mixture. The support structure can be comprised of cells having walls formed by strips of high temperature resistant metal or ceramic material. The cellular openings are in fluid communication with the outlet ends of the channels in the catalyst structure. The support structure is positioned at the outlet end of the catalyst structure to abut against the outlet end of the catalyst structure so that the cross-section of the support structure essentially covers the end face of the catalyst structure. A second support structure can also be used which is positioned at the inlet end of the catalyst structure to abut against the inlet ends of the channels in the catalyst structure.

The catalyst structure is sized such that it has a reduced cross-sectional area, taken in a direction perpendicular to its longitudinal axis, relative to the cross-sectional area of the reaction chamber such that an annular space is formed between the outer periphery of the catalyst structure and the inner surface of the reaction chamber as defined by the reaction chamber wall. The annular space is sized to allow for thermal expansion of the catalyst structure which occurs during the high temperature reaction without causing the catalyst structure to be compressed and deformed by pressing against the reaction chamber wall.

The flow of reaction gas mixture through the annular space is obstructed by inserting one or more flexible flanges which extend from the outer peripheral surface of the catalyst structure to the inner surface of the reaction chamber wall. Preferably, the flanges substantially block the flow of reaction gas mixture which would otherwise by-pass the catalyst structure. The flanges are sufficiently flexible so that the flanges will bend as the catalyst structure undergoes thermal expansion without placing sufficient stress on the catalyst structure to cause localized deformation of the catalyst structure at the points of contact with the catalyst structural wall.

The catalyst structure and the support structure are radially centered in a stable position within the reaction chamber such that the annular space between the outer periphery of the catalyst structure and the inner surface of the reaction chamber is substantially the same around the entire periphery of the catalyst structure. The catalyst structure and the support structure are radially centered by means of three or more mated radial splines and struts mounted on the peripheral surface of the open cellular support structure adjacent to the inner wall surface of the reaction chamber and/or on the peripheral surface of the catalyst structure with the corresponding mating spline or strut being mounted on the inner surface of the reaction chamber wall opposite from the spline or strut on the support structure and/or catalyst structure. The strut is meshed into the corresponding groove formed by the is spline to hold the catalyst structure in place. The depth of the groove in the spline and/or height of the strut is sized to allow for thermal expansion of the open cellular support structure and/or the catalyst structure which occurs during the high temperature reaction, while maintaining the centered position of the catalyst structure within the reaction chamber.

The support structure is stabilized against deformation caused by the axial load exerted on the face of the support structure in a direction parallel to the longitudinal axis of the catalyst structure during passage of the flowing reaction gas mixture by-means of a center support member. The center support member is secured to, and extends from, the middle of the end face of the outlet side support structure through the center of the catalyst structure in a longitudinal direction to the middle of the end face of the inlet side support structure where it is also secured. The force exerted on the outlet side of the support structure by the flowing gas reaction gas mixture is transferred via the center support member to the inlet side support structure.

Additional structure integrity is also provided to the open cellular support structure located at the inlet and the outlet ends of the catalyst structure by means of a solid, high temperature resistant outer band. Preferably, the band is bonded to the peripheral surface of the open cellular support structure. The band is thicker in width than the strips of high temperature resistant metal or ceramic material making up the cell walls of the open cellular support structure. The band has slots cut in its outer peripheral portion to provide sufficient flexibility in the metal band to absorb the thermal expansion of the thinner open cellular structure which occurs during the high temperature reaction without causing the open cellular support structure to deform due to the difference in thermal expansion between the open cellular structure and the metal band bonded thereto.

It should be clear that one having ordinary skill in the art could envision equivalents to the devices found in the claims that follow and that these equivalents would be within the scope and spirit of the claimed invention.

We claim as our invention:

1. In a catalytic reactor for use in continuous high temperature reactions comprising a monolithic catalyst structure made up of a multiplicity of longitudinally disposed channels with inlet and outlet ends for passage of a flowing reaction gas mixture secured within a reaction chamber by means of a support structure comprising a monolithic open cellular structure wherein the walls of the cells are formed by strips of high temperature resistant metal or ceramic material having cellular openings in fluid communication with the inlet and outlet ends of the channels in the catalyst structure, said open cellular support structure being positioned at the inlet and outlet ends of the catalyst structure to abut against the ends of the catalyst structure and having a cross-section which essentially covers the end faces of the catalyst structure, the improvement which comprises:

a) sizing the catalyst structure such that it has a reduced cross-sectional area, taken in a direction perpendicular to its longitudinal axis, relative to the cross-sectional area of the reaction chamber such that an annular space is formed between the outer periphery of the catalyst structure and the inner surface of the reaction chamber as defined by the reaction chamber wall, said annular space being sized to allow for thermal expansion of the catalyst structure which occurs during the high temperature reaction without causing the catalyst structure to be compressed and deformed by pressing against the reaction chamber wall;

b) obstructing the flow of reaction gas mixture through the annular space which is formed between the outer periphery of the catalyst structure and the inner surface of the reaction chamber wall by inserting one or more flexible metal flanges which extend from the outer peripheral surface of the catalyst structure to the inner surface of the reaction chamber wall to substantially block the flow of reaction gas mixture which would otherwise by-pass the catalyst structure, said metal flanges being sufficiently flexible that the metal flanges will bend as the catalyst structure undergoes thermal expansion without placing sufficient stress on the catalyst structure to cause localized deformation of the catalyst structure at the points of contact with the catalyst structural wall;

c) centering the catalyst structure and the open cellular support structure abutting against the catalyst structure in a stable position within the reaction chamber such that the annular space between the outer periphery of the catalyst structure and the inner surface of the reaction chamber is substantially the same around the entire periphery of the catalyst structure by means of three or more mated radial splines and struts mounted on the peripheral surface of the open cellular support structure adjacent to the inner wall surface of the reaction chamber and/or on the peripheral surface of the catalyst structure with the corresponding mating spline or strut being mounted on the inner surface of the reaction chamber wall opposite from the spline or strut on the support structure and/or catalyst structure, said strut being meshed into the groove formed by said spline to hold the catalyst structure in place, with the depth of the groove in the spline and/or height of the strut being sized to allow for thermal expansion of the open cellular support structure and/or the catalyst structure which occurs during the high temperature reaction, while maintaining the centered position of the catalyst structure within the reaction chamber;

d) stabilizing the open cellular support structure against deformation caused by the axial load exerted on the face of the support structure in a direction parallel to the longitudinal axis of the catalyst structure during passage of the flowing reaction gas mixture by means of a center support member disposed in an axial bore through the catalyst structure which is secured to the inlet support structure and the outlet support structure and extends through the center of the catalyst structure in a longitudinal direction, whereby a force exerted on the outlet side support structure by the flowing gas reaction gas mixture is transferred via the center support member to the inlet side support structure; and e) providing additional structural integrity to the open cellular support structure located at the inlet and the outlet ends of the catalyst structure by means of a solid, high temperature resistant metal band bonded to the peripheral surface of the open cellular support structure, said metal band being thicker in width than the strips of high temperature resistant metal or ceramic material making up the cell walls of the open cellular support structure and having slots cut in its outer peripheral portion to provide sufficient flexibility in the metal band to absorb the thermal expansion of the thinner open cellular structure which occurs during the high temperature reaction without causing the open cellular support structure to deform due to the difference in thermal expansion between the open cellular structure and the metal band bonded thereto.

2. A catalytic reactor for use in continuous high temperature reactions employing a flowing reaction gas mixture comprising:

a) a reaction chamber defined by a tubular wall defining a longitudinal axis;

b) a monolithic catalyst structure disposed in said reaction chamber, said catalyst structure having an outer peripheral surface and a multiplicity of longitudinally disposed channels, wherein said channels are formed by thin metal substrate walls which expand on exposure to the heat generated in the high temperature reaction, said channels having inlet and outlet ends for passage of the flowing reaction gas mixture; said catalyst structure being sized such that it has a smaller cross-sectional area, taken in a direction perpendicular to its longitudinal axis, than the cross-sectional area of said reaction chamber such that an annular space is formed between the outer periphery of said catalyst structure and said wall of said reaction chamber;

c) a monolithic open cellular support structure disposed in said reaction chamber, said support structure having an outer periphery and a multiplicity of longitudinally disposed passageways, wherein said passageways are formed by strips of high temperature resistant metal or ceramic material, said passageways being in fluid communication with said outlet end of said channels of said catalyst structure, said support structure being secured on its outer periphery to said wall of said reaction chamber to limit movement along the longitudinal axis, and being positioned at and abutting against said outlet end of said catalyst structure such that said support structure essentially covers said outlet end of said catalyst structure, d) a plurality of mating splines and struts mounted on the outer periphery of said support structure adjacent to the inner surface of said wall of said reaction chamber and/or on the peripheral surface of said catalyst structure, with said corresponding mating spline or strut being mounted on the inner surface of said reaction chamber wall opposite from said spline or strut on said support structure and/or said catalyst structure, said strut being disposed in a radially extending groove formed in said spline to restrain said catalyst structure from circumferential rotational movement, wherein the depth of said groove in said spline and/or the height of said strut are sized to allow for thermal expansion of said support structure and/or said catalyst structure which occurs during a high temperature reaction, while maintaining the catalyst structure and/or support structure in a radially centered position within the reaction chamber such that said annular space between the outer periphery of said catalyst structure and the inner surface of said reaction chamber is substantially the same around the entire periphery of said catalyst structure.

3. A catalytic reactor for use in continuous high temperature reactions employing a flowing reaction gas mixture comprising:

a) a reaction chamber defined by a tubular wall defining a longitudinal axis;

b) a monolithic catalyst structure disposed in said reaction chamber, said catalyst structure having an outer peripheral surface and a multiplicity of longitudinally disposed channels, said channels having inlet and outlet ends for passage of the flowing reaction gas mixture; said catalyst structure being sized such that it has a smaller cross-sectional area, taken in a direction perpendicular to its longitudinal axis, than the cross-sectional area of said reaction chamber such that an annular space is formed between the outer periphery of said catalyst structure and said wall of said reaction chamber;

c) inlet and outlet monolithic open cellular support structures disposed in said reaction chamber, said inlet and outlet support structures having outer peripheries and a multiplicity of longitudinally disposed passageways, wherein said passageways are formed by strips of high temperature resistant metal or ceramic material, said passageways being in fluid communication with said channels of said catalyst structure, said inlet and outlet support structures being secured on their outer periphery to said wall of said reaction chamber to limit movement along the longitudinal axis, said inlet support structure being positioned adjacent said inlet end of said catalyst structure, said outlet support structure being positioned adjacent to and abutting against said outlet end of said catalyst structure to abut against the end of said outlet end of said catalyst structure such that said support structure essentially covers said outlet end of said catalyst structure; and d) a plurality of flexible flanges which extend from said outer peripheral surface of the catalyst structure to the inner surface of the reaction chamber tubular wall to substantially block the flow of reaction gas mixture through said annular space, said flanges being sufficiently flexible to allow bending as said catalyst structure undergoes thermal expansion, and to prevent localized deformation of said catalyst structure where said flanges contact said catalyst structure.

4. The catalytic reactor of claim 3 wherein the open cellular support structure is stabilized against deformation caused by the axial load exerted on the face of the support structure in a direction parallel to the longitudinal axis of the catalyst structure during passage of the flowing reaction gas mixture by means of a center support member which is secured to the inlet support structure and the outlet support structure and extends through the center of the catalyst structure in a longitudinal direction, whereby a force exerted on the outlet side support structure by the flowing reaction gas mixture is transferred via the center support member to the inlet side support structure.

5. The catalytic reactor of claim 3 wherein additional structural integrity is provided to the open cellular support structure located at the inlet and outlet ends of the catalyst structure by means of a solid, high temperature resistant metal band bonded to the peripheral surface of the open cellular support structure, said metal band being thicker in width than the strips of high temperature resistant metal or ceramic material making up the cell walls of the open cellular support structure and having slots cut in its outer peripheral portion to provide sufficient flexibility in the metal band to absorb the thermal expansion of the thinner open cellular structure which occurs during the high temperature reaction without causing the open cellular support structure to deform due to the difference in thermal expansion between the open cellular structure and the metal band bonded thereto.

* * * * *